US012304774B2

(12) United States Patent
von Roda et al.

(10) Patent No.: US 12,304,774 B2
(45) Date of Patent: May 20, 2025

(54) SYSTEM FOR TRANSPORT OF THE USER WITH AN ELEVATOR TO A DESTINATION, RETROFIT SET AND METHOD

(71) Applicant: SCHAEFER GmbH, Sigmaringen (DE)

(72) Inventors: Marcus von Roda, Ruhla (DE); Jan Panier, Erfurt (DE)

(73) Assignee: SCHAEFER GMBH, Sigmaringen (DE)

( * ) Notice: Subject to any disclaimer, the term of this patent is extended or adjusted under 35 U.S.C. 154(b) by 1366 days.

(21) Appl. No.: 16/850,902

(22) Filed: Apr. 16, 2020

(65) Prior Publication Data

US 2021/0323787 A1 Oct. 21, 2021

(51) Int. Cl.

| | |
|---|---|
| ***B66B 1/34*** | (2006.01) |
| ***B66B 1/14*** | (2006.01) |
| ***B66B 1/46*** | (2006.01) |
| ***B66B 1/52*** | (2006.01) |
| ***B66B 3/00*** | (2006.01) |

(52) U.S. Cl.

CPC .............. *B66B 1/3461* (2013.01); *B66B 1/14* (2013.01); *B66B 1/468* (2013.01); *B66B 1/52* (2013.01); *B66B 3/002* (2013.01); *B66B 1/461* (2013.01)

(58) Field of Classification Search

CPC ......... B66B 1/3461; B66B 1/14; B66B 1/468; B66B 1/52; B66B 3/002; B66B 1/461; B66B 2201/4646; B66B 2201/4653

See application file for complete search history.

(56) References Cited

U.S. PATENT DOCUMENTS

2003/0159890 A1* 8/2003 Schuster ................. B66B 1/468 187/247
2011/0031070 A1* 2/2011 Gerstenkorn ........... B66B 1/468 187/382

(Continued)

FOREIGN PATENT DOCUMENTS

DE 102009049268 A1 * 4/2011 ............. B66B 1/463
DE 102017124044 A1 4/2019

(Continued)

OTHER PUBLICATIONS

UIKit | Apple Developer Documentation, https://developer.apple.com/library/content/documentation/iPhone/Conceptual/iPhoneOSProgrammingGuide/TheAppLifeCycle/TheAppLifeCycle.html, accessed Mar. 26, 2020 (4 pages).

(Continued)

*Primary Examiner* — Jeffrey Donels
(74) *Attorney, Agent, or Firm* — Fitch, Even, Tabin & Flannery LLP

(57) ABSTRACT

A system (10) is provided comprising a first communication unit (KE1), a second communication unit (KE2) and a third communication unit (KE3). The first communication unit (KE1) is mobile and can be carried by a user (B). The second communication unit (KE2) is configured to be installed in a stationary manner, preferably near an elevator shaft door (11). The third communication unit (KE3) is configured to be installed in a stationary manner at or in the elevator car (LK). By at least one of the communication units (KE1, KE2, KE3) at least one of a readiness request message and a destination message can be submitted to the control (14) of the elevator (L).

18 Claims, 11 Drawing Sheets

(56) References Cited

U.S. PATENT DOCUMENTS

| | | | | |
|---|---|---|---|---|
| 2011/0048864 | A1* | 3/2011 | Gerstenkorn | B66B 1/16 187/380 |
| 2019/0202657 | A1* | 7/2019 | Li | B66B 1/3461 |
| 2019/0276273 | A1* | 9/2019 | Zhang | B66B 1/468 |
| 2019/0330010 | A1* | 10/2019 | Li | B66B 1/468 |

FOREIGN PATENT DOCUMENTS

| | | | | | |
|---|---|---|---|---|---|
| EP | 1282578 | B1 | | 3/2005 | |
| EP | 1749775 | A1 | * | 2/2007 | B66B 1/468 |
| EP | 1749776 | A1 | | 2/2007 | |
| EP | 3536646 | B1 | * | 1/2021 | B66B 1/14 |
| EP | 3912947 | A1 | * | 11/2021 | B66B 1/3446 |
| JP | 2019167199 | A | * | 10/2019 | B66B 1/20 |
| WO | 2013/191705 | A1 | | 12/2013 | |
| WO | 2014/186946 | A1 | | 11/2014 | |
| WO | 2016/064116 | A1 | | 4/2016 | |

OTHER PUBLICATIONS

Core Bluetooth Background Processing for iOS Apps, https://developer.apple.com/library/content/documentation/NetworkingInternetWeb/Conceptu-al/CoreBluetooth_concepts/CoreBluetoothBackgroundProcessingForIOSApps/PerformingTasksWhileYourAppIsInTheBackground.htm, accessed Mar. 26, 2020 (8 pages).

European Search Report dated Jun. 16, 2020, in corresponding European Application No. 18167573.7, with machine English translation (10 pages).

* cited by examiner

Example of a floor control panel attached in front of / next to the elevator

Example of a car control panel attached in the elevator car / cabin

SYSTEM FOR TRANSPORT OF THE USER WITH AN ELEVATOR TO A DESTINATION, RETROFIT SET AND METHOD

RELATED APPLICATION(S)

This application is related to European Patent Application No. 18167573.7, filed Apr. 16, 2018, which claims the benefit of German Patent Application No. 10 2017 124 044.6, filed Oct. 16, 2017. The contents of each of the foregoing applications are incorporated herein by reference as if fully rewritten herein.

BACKGROUND

On the website https://developer.apple.com/library/content/documentation/iPhone/Conceptual/iPhoneOSProgrammingGuide/TheAppLifeCycle/TheAppLifeCycle.html the status of applications (Apps), particularly for smartphones and tablets with the operating system iOS is described. An App can either run in the foreground—this status is called Inactive or Active—or the App may not run in the foreground, because the App is either in the background and a program code is executed (this status is called "background") or the App is in the background, but no code is executed (this status is called "suspended") or the App is in a non-processed status, because the App wasn't started or was terminated by the operating system (this is called "not running"). Applications of other operating systems, e.g. watchOS or Android or Android Wear or Wear OS can be in the comparable status.

On the website https://developer.apple.com/library/content/documentation/NetworkingInternetWeb/Conceptual/CoreBluetooth_concepts/CoreBluetoothBackgroundProcessingForIOSApps/PerformingTasksWhileYourAppIsInTheBack ground.html it is described that tasks of an App that are able to run on a communication unit for establishing a Bluetooth low energy connection between two communication units can be taken over by the operating system, if the App is transferred in the status, in which the App is in the background, but no program code is executed (status: suspended) or if the App was terminated, particularly by the operating system.

TECHNICAL FIELD

One object of the invention is to provide an improved concept for the transport of a user with an elevator to a destination.

SUMMARY

According to aspects of the invention, a system for transport of a user with an elevator to a destination and a retrofit set are provided.

One embodiment of the inventive system for transport of a user with an elevator comprising a control to a destination (e.g. a destination floor) comprises a first communication unit the user can carry with, e.g. a tablet computer or a smartphone, a smartwatch, glasses, a bracelet, a portable media play device or another mobile device. The system further comprises a second communication unit that can be stationary installed, wherein the second communication unit is preferably stationary mountable at the elevator, e.g. on the level of a floor and/or at the elevator shaft (if an elevator shaft is present) and/or in or at the opening of the elevator shaft arranged in or on a floor. The system further comprises a third communication unit that can be installed inside the elevator car, such that the installed third communication unit moves commonly with the elevator car. The first communication unit is configured to communicate with the second communication unit in order to transmit to the control of the elevator by the first communication unit and preferably via the second communication unit a readiness request message and/or to communicate with the second communication unit to initiate the transmission of a readiness request message to the control of the elevator that can be, for example, transmitted by the second communication unit, in order to make the elevator ready for the transport of the user, which may comprise to call the elevator car of the elevator and/or to open the door of the elevator car. In addition, the first communication unit is configured to communicate with the second communication unit and/or with the third communication unit in order to transmit a destination message about the destination of the user to the control of the elevator. Additionally or alternatively, the first communication unit is configured to communicate with the second communication unit and/or with the third communication unit in order to initiate a transmission of a destination message about the destination of the user to the control of the elevator in order to transport the user to the destination by means of the elevator.

The retrofit set for an elevator system for retrofit of an elevator system with a system according to one embodiment of the present invention comprises at least a second communication unit and at least a third communication unit of the system according to the present invention.

Also, the use of a system described herein for transport of a user to a destination is an inventive aspect.

The system, the method and the retrofit set can be advantageously configured according to one or more of the features of the dependent claims and/or one or more of the features described in the following. If a feature is described as method step in the following, the system and/or one or more components of the system are preferably configured to carry out this method step. Such a component or components of the system can be, e.g. a first communication unit, a second communication unit, a third communication unit, a floor control panel and/or a car control panel.

The readiness request message can contain information about the destination of the user or may not contain any information about the destination. The destination message and the readiness request message can be one and the same message or can be different messages. The system can be configured in that the readiness request message and the destination message are transmitted separately as individual transmissions, preferably subsequently, or in that the readiness request message and the destination message are transmitted in a common message, e.g. to the second communication unit. For example, the destination message can be interpreted by the system and preferably by the second communication unit and/or the elevator control as readiness request message, such that the transmission of an individual, separate readiness request message is preferably not necessary.

Preferably the first communication unit is configured to transmit the readiness request message from the first communication unit to the second communication unit.

The first communication unit can be configured to send the destination message directly to the third communication unit, if the user is located, e.g. in or at the elevator car.

Preferably the second communication unit is configured to inform the third communication unit about the destination, e.g. in one or more of the following cases:

the elevator car door of the elevator car selected to comply with the travel requirement of the user is open on the floor, on which the elevator ride begins; and/or the elevator cars are in direct proximity of the floor, on which the elevator ride of the user begins; and/or the elevator car selected to comply with the travel requirement of the user arrives or has arrived on the floor, on which the user is located.

Preferably the third communication unit is configured to transmit the destination to the control of the elevator. The second communication unit is preferably not configured to directly transmit the destination to the control of the elevator, but at most indirectly via the third communication unit.

In particular, preferred embodiments of the inventive system the first communication unit are configured to communicate the destination of the user to the second communication unit, wherein the second communication unit is configured to preferably directly—and not via the control of the elevator—communicate the destination to the third communication unit. The third communication unit is preferably configured to subsequently communicate the destination to the control of the elevator.

The system and, e.g. the third communication unit that is arranged in or at the elevator car and/or the first communication unit is preferably configured to determine whether the user has moved the first communication unit into the elevator car, in order to determine whether the user has entered the elevator car. For example, the system can determine the signal strength of the communication connection between the first communication unit and the third communication unit, e.g. by means of the first communication unit and/or the third communication unit. For example, the radio signal strength of the first communication unit and/or the third communication unit can be measured by the system, e.g. the third and/or the first communication unit. The system and, for example, the first communication unit and/or the third communication unit can be configured to determine that the first communication unit was moved into the elevator car, if the signal strength of the communication connection between the first communication unit and the third communication unit exceeds a threshold. The system can be configured to submit a destination message about the destination of the user to the third communication unit and/or the control of the elevator under the condition that it has been determined, particularly by the system, that the user has moved the first communication unit in the elevator car.

The system and, e.g. the first communication unit, can be configured to initiate submission of a readiness request message to the control of the elevator, e.g. sent from or via the second communication unit and preferably from the first communication unit to the second communication unit and then to the control of the elevator, if the user approaches the second communication unit with the first communication unit and/or if the user or the first communication unit respectively have reached a predefined distance to the second communication unit. The system and, e.g. the first communication unit and/or the second communication unit can be configured to determine the distance of the first communication unit from the second communication unit and/or to determine approach of the second communication unit by the first communication unit by determination of the signal strength and/or the change of the signal strength of the communication connection between the first communication unit and the second communication unit. The system can determine the distance or a change of the distance, e.g. by measurement of the radio signal strength of the first communication unit and/or the second communication unit by means of the second and/or the first communication unit.

The system can be configured to submit a message to the first communication unit that the elevator is in the vicinity of the user, wherein the message preferably contains an identifier of the elevator and/or the estimated distance to the elevator.

Preferably the first communication unit and the second communication unit are configured in the system, preferably to communicate with each other, in order to initiate the submission of a readiness request message to the second communication unit in case of a relative distance to each other that is larger than the range of a near field communication. The first communication unit and the second communication unit are preferably configured to communicate with each other in the system in order to initiate the submission of a readiness request message to the second communication unit over a relative distance to each other of at least 1 meter.

The first communication unit can be configured to submit identification information about the first communication unit and/or the user to the second communication unit. The identification information can be included and/or used to submit a readiness request message and/or destination message to the second communication unit.

The second communication unit is preferably configured to submit to the first communication unit one or more of the following information: Identification information about the second communication unit, information about the position of the elevator and/or the second communication unit and/or the first communication unit, information about the floor, in which the user is located.

The first communication unit can contain identification information about the first communication unit and/or the user. Alternatively or additionally, the first communication unit can contain destination information about the destination of the user. The system can be configured to use the identification information for determination of the destination of the user and/or as destination message or part of a destination message for the submission of the destination of the user. Additionally or alternatively, the system can be configured to determine whether an authorization of the user exists for using the elevator and/or for travelling to the destination and/or for entering the destination, particularly a destination floor. Additionally or alternatively, the system can be configured to transmit the destination information from the first communication unit as destination message or part of the destination message to the second communication unit and/or the third communication unit.

The first communication unit can contain an identification information about the first communication unit and/or the user, wherein the first communication unit can be configured to transmit the identification information to the second communication unit, wherein the second communication unit can be configured to determine the destination of the user based on the transmitted identification information from a storage. Additionally or alternatively, the first communication unit can be configured to transmit the identification information to the third communication unit, wherein the third communication unit is configured to determine the destination of the user based on the transmitted identification information from a storage.

The system can comprise a storage on an external server, e.g. outside the elevator, outside the building in which the elevator is installed, outside the first and/or the second and/or the third communication unit. The storage can contain destination information. The server can be configured to submit the destination information from the storage as a destination message about the destination of the user to the first communication unit. Alternatively or additionally, the server can be configured to submit the destination information from the storage as destination message about the destination of the user to the third communication unit. Alternatively or additionally, the server can be configured to submit the destination information from the storage as destination message about the destination of the user to the second communication unit, wherein the second communication unit is preferably configured to submit a destination message about the destination of the user to the third communication unit following the transmission of the destination message from the server to the second communication unit.

The elevator preferably comprises a floor control panel in at least one floor, wherein the second communication unit is preferably configured and determined to be installed at or in or near the floor control panel of the elevator. The second communication unit can be configured and determined to be attached to the support of the floor control panel (e.g. a wall of the building on the floor on which the floor control panel is arranged, a column, etc.). The second communication unit can be configured and determined to be attached in and/or at a cavity (e.g. in an installation shaft in a support of the floor control panel, for example, in a wall of the building on the floor on which the floor control panel is arranged), in and/or at which the floor control panel is attached.

A second communication unit can be integrated in the floor control panel. Preferably the second communication unit for a floor is, however, a unit separate from the floor control panel for the floor, wherein the second communication unit is in communication connection with the floor control panel and/or with control of the elevator that is preferably a unit separate from the floor control panel and/or the car control panel of the elevator. The second communication unit can be in communication connection with the control of the elevator via the car control panel. However, preferably the second communication unit is in direct communication connection with the control of the elevator and not via the car control panel. The control of the elevator is a unit separate from the floor control panel and/or the car control panel.

In a building that is equipped with an embodiment of the inventive system at least one second communication unit can be provided for each elevator of the building and for each floor, the second communication unit being configured and determined to be arranged substantially on the level of the floor, e.g. on the floor or in the elevator shaft of the elevator.

Preferably the elevator comprises a car control panel in the elevator car. The third communication unit is preferably configured and determined to be installed at or in or near the car control panel of the elevator car. The third communication unit can be, e.g. configured and determined to be attached at a support of the car control panel (e.g. at an elevator car wall, a column in the elevator car, etc.). The third communication unit can be configured and determined to be attached in and/or at a cavity in and/or at which the car control panel is attached (e.g. in an insulation shaft in the support of the car control panel, such as a wall of the elevator car, a column in the elevator car).

The third communication unit can be integrated in the car control panel. The third communication unit is, however, preferably a unit separate from the car control panel, wherein the third communication unit is in communication connection with the car control panel and/or with the control of the elevator, that is preferably a unit separate from the floor control panel and/or the car control panel of the elevator. The third communication unit can be in communication connection with the control of the elevator via the car control panel.

In a preferred embodiment the floor control panel comprises at least one operation element for control of the elevator, e.g. for calling the elevator, wherein the operation element when actuated by the user of the elevator, transmits a preferably electrical actuation signal to the control of the elevator via a connection device, e.g. a cable or a radio transmission, wherein the second communication unit is connected with the connection device, in order to transmit a respective actuation signal to the elevator control via the connection device. The operation element of the floor control panel when actuated by a user of the elevator can, e.g. transmit a preferably electrical actuation signal to an elevator control via a connection line, wherein the second communication unit is connected between the at least one operation element of the floor control panel and the elevator control with the connection device in order to transmit a respective actuation signal to the elevator control via the connection device.

In preferred embodiments of the system the car control panel comprises at least one operation element for control of the elevator, e.g. for destination selection, wherein the operation element transmits the preferably electrical actuation signal to the control via a connection device, wherein the third communication unit is connected with the connection device in order to transmit a respective actuation signal to the control of the elevator via the connection device. The operation element of the car control panel, when actuated by the user of the elevator, can transmit for example a preferably electrical actuation signal to an elevator control via a connection device, wherein the third communication unit is connected between the at least one operation element of the car control panel and the elevator control with the connection device, in order to transmit a respective actuation signal to the elevator control via the connection device.

The second communication unit is preferably configured for remote communication over a distance with the third communication unit, e.g. in order to submit the destination message about the destination of the user to the third communication unit, particularly in order to submit the destination message from the second communication unit to the third communication unit, wherein the distance is larger than the range of a near field communication. The second communication unit can be, e.g. configured for remote communication with the third communication unit over a distance of at least 1 meter.

The first communication unit is preferably configured for remote communication over a distance with the third communication unit, wherein the distance is larger than the range of a near field communication. This configuration with a larger range can have the purpose to submit the destination message about the destination of the user to the third communication unit, particularly to submit the destination message of the first communication unit to the third communication unit. In addition or as an alternative, the configuration can have the purpose to determine the distance between the first communication unit and the third communication unit, preferably in order to determine whether the user has entered the elevator car. The first communication unit can be, e.g. configured for remote communication with the third communication unit over a distance of at least 1 meter.

The first communication unit and the second communication unit and/or the first communication unit and the third communication unit and/or the second communication unit and the third communication unit can be configured to be coupled with each other within a Wireless Personal Area Network, for wireless communication with each other, e.g. for transmission of the readiness request message and/or the destination message.

The first communication unit and the second communication unit and/or the first communication unit and the third communication unit and/or the second communication unit and the third communication unit can be configured to communicate with each other via a radio connection, preferably a radio connection according to the Bluetooth standard, particularly preferably a radio connection according to the Bluetooth-Low-Energy Standard, e.g. for submission of the readiness request message and/or the destination message.

The first communication unit can be configured to communicate with the second communication unit by means of Bluetooth Advertisement, e.g. for submission of the readiness request message to the second communication unit. Alternatively or additionally, the second communication unit can be configured to communicate with the first communication unit via Bluetooth Advertisement, e.g. for submission of an identification information via the second communication unit and/or information about the position of the first communication unit and/or a position about the second communication unit and/or a position about the elevator to the first communication unit.

The first communication unit is preferably configured for executing an application (application software that is also called App). The first communication unit is preferably configured to communicate with the second communication unit and/or the third communication unit and/or the control of the elevator controlled via or by the application.

The first communication unit can be configured to receive a user input (e.g. manually and/or via voice input) a readiness request of the user and to submit a readiness request message to the second communication unit based on the input readiness request. Alternatively or additionally, the first communication unit can be configured to receive a user input (e.g. manually and/or via voice input) of the destination of the user and to submit the destination in a destination message to the second communication unit and/or the third communication unit.

In preferred embodiments the system is configured for carrying out a method for transmission of data between the first communication unit and the second communication unit and/or between the first communication unit and the third communication unit. According to the method, an indication radio signal, e.g. a Bluetooth-Low-Energy (BLE)-Advertisement is sent from the first communication unit while the application that is able to run on the first communication unit is not run in the foreground. The application can thus, e.g. be in the background while executing program code (background) or being the background, while not executing program code (suspended) or be in a status (not running) neither in the foreground nor in the background, in which the application can be brought, if it was started by the user and then terminated by the operating system in order to save energy. The indication radio signal is preferably free of an identifier for identification of the first communication unit. However, for example the indication radio signal can contain information about whether the first communication unit is an iOS, a watchOS, an Android, an Android Wear or a Wear OS device. The sent indication radio signal is received by the second communication unit and/or the third communication unit. Due to the received indication radio signal, the connection between the first communication unit and the second communication unit and/or between the first communication unit and the third communication unit is established. For this the App is preferably transitioned into the background status, in which the App executes program code (status: background), if the App is not already in this status, e.g. if the App was terminated by the operating system for saving energy (status: not running). Thus, the App is, for example, transitioned from a status in the background without executing code (status: suspended) or from a status (not running) in which it was terminated by the operating system to save energy in the background mode in which the App executes code (status: background). Via a connection established in this manner between the first and second communication unit, data can be transmitted from the first communication unit to the second communication unit and/or from the second communication unit to the first communication unit. Via such a connection established between the first and third communication unit, data can be transmitted from the first communication unit to the third communication unit and/or from the third communication unit to the first communication unit. If in this description or in the claims data are mentioned, this term comprises at least one datum, e.g. the destination of a user, particularly the destination floor and/or an identifier for identification of the first communication unit or an identifier for identification of the user and/or the access authority of a user and/or a command, particularly a readiness request message is submitted.

Alternatively or additionally, the system is in a preferred embodiment configured for carrying out another method for transmission of data between the first communication unit and the second communication unit and/or for carrying out another method for transmission of data between the first communication unit and the third communication unit, wherein an application (App) can be run on the first communication unit (it can be the same application as explained above) for transmission of data between the first communication unit and the second communication unit and/or for transmission of data between the first communication unit and the third communication unit. According to the method, a sending of an indication radio signal, particularly a Bluetooth-Low-Energy Advertisement, is carried out by the second communication unit and/or sending of an indication radio signal, particularly a Bluetooth-Low-Energy Advertisement, is carried out by the third communication unit. The sent indication radio signal is received by the first communication unit while the App is not running in the foreground. For example, the App can be in the background executing program code (background status) or be in the background, but not executing program code (suspended status) or can be neither in the foreground nor in the background, i.e. in a status (not running) in which the application is transitioned, if it was started by the user and then terminated not by the user, but from the operating system in order to save energy. Based on the received indication radio signal, the status of the application can be automatically changed. Particularly, the application can be transitioned into a status in which the application executes program code in the background (background status) or the application is transitioned into the foreground. It is preferably preset to the operating system of the first communication unit, which identifier of the second communication unit and/or the third communication unit predefined by the provider of the system, e.g. the user, is to be considered or observed and it is preset to the operating system that it shall transition the application in one of the statuses indicated above, if the indication radio signal is received with exactly the predefined identifier of the second communication unit or with the predefined identifier of the third communication unit. Then a connection between the first communication unit and the second communication unit is established and/or a connection between the first communication unit and the third communication unit is established. Via the connection established in this manner between the first and second communication units, data can be transmitted from the first communication unit to the second communication unit and/or from the second communication unit to the first communication unit. Via a connection established in this manner between the first and third communication units, data can be transmitted from the first communication unit to the third communication unit and/or from the third communication unit to the first communication unit. For example, destination of the user, particularly a destination floor, or an identifier for identification of the first communication unit or the user or an access authorization of the user or a command, particularly a readiness request message is transmitted.

In the method according to the first aspect, the ability of the first communication unit is used to send indication radio signals, also if the App is not running in the foreground. Based on this method a connection between the first communication unit and the second communication unit or between the first communication unit and the third communication unit can be quickly established, e.g. after the first communication unit enters the range of the second communication unit or the range of the third communication unit, if the ability of the first communication unit to search for indication radio signals with a sufficient frequency per time unit is not provided. In the method according to the second aspect, the ability of the first communication unit is used to search for indication radio signals that were sent out, even if the App is not running in the foreground. Based on this method a connection between the first communication unit and the second communication unit or between the first communication unit and the third communication unit can be quickly established, e.g. after the first communication unit has entered the range of the second communication unit or the third communication unit, if the ability of the first communication unit to search for indication radio signals with sufficient frequency per time unit is not provided.

In the scope of this invention the indication radio signal is a signal that indicates to other communication units that the first communication unit or the second communication unit or the third communication unit that sends out the indication radio signal is present in the vicinity. The indication radio signal can particularly be a Bluetooth-Low-Energy Advertisement. Based on the Bluetooth-Low-Energy Advertisement, preferably a Bluetooth-Low-Energy connection is established between the first communication unit and the second communication unit or the first communication unit and the third communication unit respectively based on a method as explained above. The system is preferably configured to carry out such a method.

Particularly in the above-described other methods the second communication unit or the third communication unit sends preferably Bluetooth-Low-Energy Advertisements with an identifier predefined by the provider of the system to the second communication unit or the third communication unit respectively, wherein the interval for sending out the Bluetooth-Low-Energy Advertisements can be preferably configured. The identifier can be particularly an UUID that can have a length of 128 bit. The first communication unit scans for Bluetooth-Low-Energy Advertisements with this predefined identifier, while the application on the first communication unit does not run in the foreground, but is in the suspended or not running status for example.

In the method described above the connection between the first communication unit and the second communication unit or the connection between the first communication unit and the third communication unit is established preferably automatically, i.e. without user input or without the need to transition the App in the foreground mode under the condition that the user has primarily provided specific data to be transmitted. The specific data to be transmitted can be, e.g. the command "provide elevator" and/or an identifier for identification of the user and/or the first communication unit and/or a destination floor to be transmitted. For this the application is preferably transitioned into the background (e.g. status not running or suspended) prior to establishing the connection, such that it comprises the status of being in the background and executing program code (background status). The data are preferably provided on the first communication unit. The data can be, e.g. input on a user interface of the App in order to provide these data in advance. The specific data are submitted to the second communication unit via the connection while the application remains preferably in the background or the specific data are submitted to the third communication unit while the application remains preferably in the background.

In alternative embodiments of the other methods described above the application is transitioned in the foreground mode subsequent to the receipt of the indication radio signal by the first communication unit. This can be carried out particularly by a user input in the first communication unit. Between the first communication unit and the second communication unit a connection is established, wherein a data input in the first communication unit is enabled for the user, wherein the data input are submitted from the first communication unit to the second communication unit. In analog manner a connection can be established between the first communication unit and the third communication unit, wherein a data input in the first communication unit is enabled for the user, wherein the data input are submitted from the first communication unit to the third communication unit.

In embodiments of any of the methods described above, the first communication unit can send indication radio signals, particularly Bluetooth-Low-Energy Advertisements, after establishing the connection to the second communication unit or the third communication unit, e.g. for establishing a connection with another second communication unit or another third communication unit. In order for the first communication unit to send indication radio signals after the connection has been established, it is potentially necessary to disconnect the connection to the second communication unit or the third communication unit before. The sending of the indication radio signals and if necessary also the interruption of the connection is preferably carried out without the need of a user input. Particularly the application can remain in the background for this purpose. The first communication unit sends the indication radio signals, particularly after the separation of the connection in order that additional second communication units and/or additional third communication units can receive these radio signals in order to connect with the first communication unit and/or in order to be able to determine a distance between the first communication unit and the additional second communication units or between the first communication unit and the additional third communication units.

Any operating system suitable for a mobile device van be installed on the first communication unit, for example an iOS operating system or Android operating system or watchOS operating system or Android Wear operating system or Wear OS operating system can be installed on the first communication unit.

In embodiments of the invention according to the methods of the invention described above, the first communication unit does not need any user input starting from entering of the user with the first communication unit in the transmission or receive range of the second communication unit and/or from inclusively the sending out of the indication radio signal by the first communication unit or the second communication unit until inclusively the transmission of data. In embodiments of the invention according to the methods of the invention described above, the first communication unit does not need any user input from inclusively entering of the user with the first communication unit in the receive or transmission range of the third communication unit and/or from inclusively the sending of the indication radio signal by the first communication unit or the third communication unit until inclusively the transmission of data. For example, the first communication unit can also remain in the pocket of a user. A running of the application in the foreground is not necessarily required.

The system is particularly suitable for physically handicapped persons, e.g. blind persons or for mentally handicapped persons, because the system does not need user input, particularly beginning inclusively with entering the transmission and/or receive range of the second communication unit in which the second communication unit is able to receive or send out radio signals until inclusively the transmission of data to the second or third communication unit and if necessary, until inclusively the transmission of the destination to the control of the elevator. Particularly, a user input by typing or voice input is not necessary.

The at least one second communication unit of the retrofit set is preferably configured and determined to be connected with a floor control panel of an elevator of the elevator system that is provided at the outside of the elevator, in order to submit a command to the control of the elevator via the floor control panel. Alternatively, the second communication unit of the retrofit set can be configured and determined to be directly connected with the control of the elevator, i.e. not via the floor control panel. The at least one third communication unit of the retrofit set is preferably configured and determined to be connected with a car control panel of an elevator car of an elevator of the elevator system that is provided in the elevator car for selecting a floor, in order to submit a command to the control of the elevator via the car control panel. Alternatively, the third communication unit of the retrofit set can be configured and determined to be directly connected with the control of the elevator, i.e. not via the car control panel.

The second communication unit of the retrofit set is preferably configured and determined to be connected with a connection line between the floor control panel and the control of the elevator of an elevator of the elevator system for submission of a readiness request message from the floor control panel to the elevator control in order to submit a readiness request message to the control of the elevator via the connection line.

The third communication unit is preferably configured and determined to be connected with a connection line between the car control panel and the elevator control of an elevator of the elevator system for submission of a destination message from the car control panel to the control of the elevator, in order to submit a destination message to the control of the elevator via the connection line.

The inventive system can be, e.g. connected to a facility management system.

The system for the elevator can, e.g. comprise at least the following:

Floor control panel (also called call panel, operation panel, floor operation panel): In each or also only in individual accessible floors a respective floor control panel is preferably provided in front of or next to the elevator. The floor control panel can be connected with a respective additional electronic module GIM (Guide Interface Module)—which is an example for the second communication unit. This electronic module or this second communication unit can be accommodated in the panel itself or by a respective installation in the proximity of the panel. The second communication unit can be arranged at an opening on the floor to the elevator shaft, if present. In doing so, it is also possible to use already provided installations (e.g. an elevator system already installed in a building) and to connect the GIM (here: the second communication unit) to the provided system without construction modifications that are visible from the outside. As an option it is also possible to connect a speaker (e.g. to the floor control panel and/or the second communication unit), in order to provide an acoustic feedback to the user that can be beneficially, e.g. for visually handicapped and particularly blind persons and can make the elevator barrierless or barrier-free. By means of the first communication unit, e.g. a smartphone, and if the App (e.g. Smartphone App) is adjusted accordingly, the GIM for the floor control panel, e.g. the GIM in the floor control panel, can determine the language the user speaks or uses and the acoustic output can be adapted to the language of the user, if the system is configured accordingly.

FIG. 1 shows an example of a floor control panel, wherein the configurations and the appearance of the panel can also be different from the illustration of FIG. 1. The floor control panel can, however, preferably comprise one operation element for manual operation that can be configured to be pushed or pressed or touched. The panel can be completed by additional elements, like indication symbols, travel direction indications in any embodiment, key switches, etc.

Car control panel (also called car panel or car operation panel): In the elevator car (also called car or elevator cabin) preferably at least one car control panel is provided that is preferably connected with an additional electronic module GIM (Guide Interface Module) as an example for a third communication unit. This electronic module or the third communication unit can be accommodated, e.g. in the panel itself or by a respective installation in the proximity of the panel. Also here a retrofit at existing systems without GIM, i.e. without the third communication unit, is preferably possible at any time without the requirement to make relevant construction modifications. By providing personalization possibilities as an option in an App (application) that is preferably stored in the system, e.g. on the first communication unit and that is able to run on the first communication unit and/or that can be accessed by means of the first communication unit, the elevator is preferably enabled to indicate individual reactions or destination proposals, e.g. by personalization possibilities of the smartphone App as an option. By the first communication unit the GIM or the third communication unit in the car control panel can preferably determine the language the user speaks or uses, if for example the smartphone App is configured accordingly and the acoustic output can be preferably provided in the respective language of the user.

FIG. 2 shows an example of a car control panel that can be arranged in the elevator car, wherein the configurations and the appearance of the car control panel can also be different from the illustrated embodiment. However, it comprises preferably at least two operation elements for a manual floor selection that are configured to be pushed or pressed or touched. The operation elements can be individual components or can form a unit with a display. The panel can be provided, e.g. with operation means to open/close the door, an emergency button, indicator elements and can be completed by additional elements, like indication symbols, key switches, etc. in any arbitrary configuration.

The call or request of the elevator and also the floor selection can be carried out preferably, as described, via an App of the system created for this purpose, e.g. a smartphone App. This App can be installed on the first communication unit, e.g. a smartphone and can preferably provide one or more of the following functions:

Automatic identification of a potential elevator user, e.g. via radio transmission technique, e.g. via BLE (Bluetooth Low Energy), preferably between the floor control panel and the first communication unit (e.g. smartphone) and/or between the car control panel and the first communication unit and/or between the second communication unit and the first communication unit and/or between the third communication unit and the first communication unit, if the App is activated, e.g. on the first communication unit. This is also possible in the background mode of the App on the first communication unit. For example, an automatic identification of a potential elevator user via BLE (Bluetooth Low Energy) is possible, if the App is activated on the first communication unit. This is particularly, as described, also possible in the background mode of the first communication unit.

The destination of the user can be pre-specified in the App, e.g. a floor, wherein the system can be configured to automatically transmit the pre-specified at least one destination to the control of the elevator. For example, the system can be configured to transmit the predefined at least one destination automatically to the third communication unit that can be, e.g. part of the car control panel in order to transmit the at least one destination to the control of the elevator. For example, the third communication unit can be configured to transmit the predefined destination during or after the entering of the car by the user automatically to the control of the elevator, such that the elevator transports the user to the destination.

Different pre-adjustments can be possible for automatic floor selection during entering of the car, e.g. a standard floor selection. This means that the car control panel preferably recognizes, when activated on the first communication unit (smartphone), the selected floor and automatically makes a respective selection when entering the car. The App can be configured to receive identification information about the user. The system can comprise a voice output unit, wherein the first communication unit can be configured by the App to transmit the identification information of the user to the voice output unit or to initiate the transmission of the identification information to the voice output unit. The voice output unit can be configured to use the name of the user for the voice output. Additionally or alternatively, the system can be configured to output a proposal for destination (e.g. floor destination) to the user based on the identification information and can also be configured to receive a confirmation of the user about the proposed destination.

As an option, a personalization is possible, i.e. the input of the name etc., such that the elevator reacts in a personalized manner to the user and for example uses the name of the user for providing output information, such as destination proposals by optical and/or acoustical output.

The first communication unit is preferably configured to receive a manual input from the user via the App in order to carry out one of the following based on the input: Transmit a readiness request message and/or a destination message to the control of the elevator; initiate the transmission of a readiness request message and/or a destination message to the control of the elevator. The first communication unit is particularly preferably configured to call the elevator and/or to submit the destination of the user to the control of the elevator based on the user input. Particularly, the first communication unit is preferably configured to trigger the transmission of a readiness request message to the control of the elevator and/or to trigger the transmission of a destination message as a reaction on the user input.

Preferably it is possible to call the elevator and/or to manually select the destination floor by use of the first communication unit, particularly the smartphone.

The first communication unit is preferably configured for one or more of the following: User input, e.g. the destination, the name of the user, the actual travel request of the user, etc.; acoustic output of information, such as “elevator ready”, “elevator number 2 is ready”, “elevator arrives” or the like; output information about where the elevator car is located (e.g. on which floor), which floor is the next destination, etc. This configuration of the first communication unit can be enabled in combination with the elevator system.

Preferably it can be possible to activate an acoustic output of functions and/or events.

The App can preferably output information about where the elevator is located and to which floors the elevator travels next.

Preferably the possibility of individual language adjustments is provided. The system can be multilingual and can make it simpler for foreigners to more easily and quickly find their way, if also the acoustic output in the elevator is provided in their respective native language.

The system can also comprise an additional function “private/non-public area”: As an optional additional function the ride of an elevator to an area can be selected that is accessible for authorized persons only. In doing so, the private/non-public area (e.g. private floor) can be pre-specified or pre-configured in the App and can thus be used as automatic floor selection. It is alternatively or additionally preferably possible to manually select this private/non-public area on the first communication unit or smartphone and to initiate the elevator ride to this destination. In both cases this may be carried out preferably by an input/activation by means of a code on the first communication unit. The car control panel can be configured in a way that a private/non-public area or floor cannot directly be selected by one or more of the following measures:

The panel does not provide an accessible operation element for selecting the private/non-public area or floor;

The selection can only be executed via an interface (touchscreen, keyboard, etc.) including the input of a code;

A key for operating a key switch to activate the private/non-public area or floor is necessary;

No indication is present on the panel to a respective private/non-public area or floor (hidden area or floor).

EXAMPLES FOR OPERATION

Example 1—Automatic Use

Initial Situation:

The floor control panel is connected with an additional GIM (Guide Interface Module) as an example for a second communication unit. Alternatively or additionally, the second communication unit can be directly connected with a wireless or wired connection device, particularly control line that leads to the control of the elevator. A connection via the floor control panel is also not required.

The car control panel is connected with an additional GIM (Guide Interface Module) as an example for a third communication unit. Alternatively or additionally, the third communication unit can be directly connected with the control device, particularly control line that leads to the control of the elevator. A connection via the car control panel is not necessary.

The App on the first communication unit, e.g. smartphone, is activated. The App can be in the background mode of the first communication unit.

For example, the fourth floor is selected as destination floor.

Procedure (Example):

I. The user approaches the elevator.

II. If the user is sufficiently close to the elevator, e.g. in a distance of about between 20 and 50 meters, the floor control panel recognizes the user and/or the first communication unit he or she carries, preferably via a BLE-Advertisement that is sent out by the second and first communication units, i.e. for example the GIM of the floor control panel and the smartphone. In doing so, the first and second communication units recognize each other. The distance the user has to approach the elevator in order for recognition to be carried out can be adjustable, in some embodiments in a stageless manner. The user preferably receives a message on the first communication unit that an elevator is in the vicinity (e.g. with identification of the name and/or the estimated distance). Based on the Advertisements the first communication unit knows on which floor it is located and preferably where the elevator is located at the moment. Preferably the second communication unit recognizes the destination floor to which the user desires to travel. As an option, a preferably provided output unit, with which the floor control panel can be equipped, can output an acoustic pilot signal comparable to traffic lights for blind people, in order to simplify locating the elevator for visually handicapped persons, particularly blind persons. Particularly, if an acoustic pilot signal is output as an option, the output of a respective visual detectable message by the first communication unit can be omitted.

III. The elevator is automatically called to the floor, in which the user is located by the floor control panel.

IV. The doors of the elevator open.

V. Preferably the floor control panel with the GIM waits until the user approaches the panel and informs the user whether the elevator has already arrived as soon as the user enters preferably adjustable near range (e.g. 1-2 meters).

VI. The floor control panel informs the car control panel (preferably via the GIMs of the floor control panel and the car control panel) that the user wants to enter the elevator. As an option, an output unit with which the car control panel may be equipped, can send an acoustic pilot signal, as is known from traffic lights for blind persons beginning with this point of time in order to simplify locating of the correct elevator for visually handicapped and particularly blind persons, particularly if multiple elevators are available in large lobbies or the like. Particularly, if an acoustic pilot signal is sent out as an option, the output of a respective visual message by the first communication unit can be omitted.

VII. The user enters the elevator.

VIII. Preferably the car control panel, e.g. by means of the GIM, is able to determine the distance to the user, preferably via measurement of the radio signal strength of the BLE-signal to the first communication unit (smartphone).

IX. If the user is sufficiently near to the car control panel (preferably less than 1 meter), according to the example the fourth floor is automatically selected and the elevator travels together with the user to the fourth floor. The destination (here: fourth floor) can be submitted to the GIM of the car control panel, for example, wherein the GIM of the car control panel submits the destination, e.g. via the car control panel to the control of the elevator. The control of the elevator in turn controls the elevator subsequently such that the elevator travels together with the user to the fourth floor.

X. As an option the user can select the destination floor on his or her own by operating of one of more of the operation elements of the car control panel, e.g. by pressing and/or touching one or more buttons of the panel or by use of the application of the first communication unit, particularly the smartphone App.

XI. The elevator opens the doors on the fourth floor and the user leaves the elevator.

As an option, an acoustic output of the functions and/or actions can be activated.

In an example 2 that is an example for manual use the initial situation is as follows:

The floor control panel is connected with an additional GIM (Guide Interface Module) that is an example for a second communication unit.

The car control panel is connected with an additional GIM (Guide Interface Module) that is an example for a third communication unit.

The App on the first communication unit, e.g. smartphone is activated.

The progress for the method can be as described in the following. The progress can be particularly similar to the progress of the automatic use. However, manual use may be carried out, e.g. if the user of the App has deactivated the automatic use:

I. The user approaches the elevator.

II. If the user has approached the elevator as far as a specific distance, e.g. as far as a distance between 20 and 50 meters, the user receives preferably a message on the first communication unit, e.g. smartphone, that an elevator is in the vicinity. Preferably, the message can contain the name or identification and/or an estimated distance to the elevator. The user selects a destination floor on the first communication unit that is preferably transmitted via BLE to the GIM of the floor control panel. As an option a preferably present output unit, that may be part of the floor control panel, can be provided. Just after the selection of the destination floor the output unit may output an acoustic pilot signal, as known from traffic lights for blind persons, in order to simplify finding the location of the elevator for visibly handicapped and particularly blind persons. Particularly, if an acoustic pilot signal is emitted, the output of a visually detectable message by the first communication unit can be omitted. Preferably, based on the selection of the destination floor by the user, a submission of a readiness request message to the GIM of the floor control panel is initiated. For example, the submission of the destination floor to the GIM of the floor control panel can be interpreted as readiness request message. The floor control panel by means of the GIM or the GIM directly calls the elevator initiated by the readiness request message.

III. The elevator is called by the floor control panel to the floor on which the user is located.

IV. The doors of the elevator open.

V. As an option, the GIM of the floor control panel waits until the user approaches the panel and informs him or her whether the elevator is already present, if the user has entered a near range that is preferably adjustable in the App.

VI. The GIM of the floor control panel informs the GIM of the car control panel preferably that the user wants to enter the elevator. As an option, an output unit that might be part of the car control panel may emit an acoustic pilot signal as known from traffic lights for blind persons in order to simplify finding the location of the elevator for visually handicapped persons (e.g. if multiple elevators are present on the floor, for example in large lobbies). Particularly, if the acoustic pilot signal is emitted as an option, the output of a visually detectable message by the first communication unit can be omitted.

VII. The user enters the elevator.

VIII. The GIM of the car control panel determines the distance to the user via BLE radio signal strength measurement to the first communication unit, e.g. smartphone.

IX. If the user is sufficiently near the car control panel (e.g. less than 1 meter), the destination floor, e.g. fourth floor, is automatically selected and the elevator travels with the user to the destination floor. The destination can be, for example, submitted to the GIM of the car control panel, wherein the GIM of the car control panel submits the destination either directly or indirectly, e.g. via the car control panel to the control of the elevator. The control of the elevator then controls the elevator such that the elevator travels with the user to the destination floor.

X. As an option, the user in the elevator may be allowed to independently change the destination floor, e.g. by operating one or more operation elements of the car control panel or by using the application on the first communication unit, e.g. smartphone App.

XI. The elevator opens the doors in the destination floor and the user leaves the elevator.

Advantages of the Inventive System:

The inventive system is preferably no closed system, but can preferably retrofit in a multiplicity of different elevator systems. The inventive system can be retrofit preferably without reconstructions visible from the outside in an already installed elevator system. Due to the possibility of generating acoustic pilot signals, already existing elevators can be configured barrierless. Also the use of a smartphone as an example for a first communication unit may simplify the call and control of elevators also for visibly handicapped or blind persons. The system is preferably multilingual and can adapt any lingual output to the language the user uses. Also information in the elevator can be adapted like this to the user preferences. The system can preferably retrofit in an elevator system that, even without the inventive system, already provides control functions for control of the elevator, e.g. call of the elevator by actuating an operation element at the floor control panel, selection of the destination floor by actuating an operation element at the car control panel, in order to use the elevator in a building for transport of persons. Preferably the retrofit system is configured such that control functions of the elevator system that already existed before the retrofit are maintained. In maintaining the former control functions, the control of the enhanced elevator system may be carried out in a known way, i.e. in a manner as before the elevator system was retrofit with the inventive system. After the retrofit an additional possibility is created to call and control the elevator with the first communication unit. It is particularly preferred, if the system is configured to use a wireless or wired connection of an existing elevator system for retrofitting the inventive system in order to transmit messages, e.g. a readiness request message for calling the elevator and/or a destination message to the existing control of the elevator. The behavior of the elevator remains the same in this case compared with its conventional use with the former control functions. This can also mean that the first communication unit at least initially only establishes connection to the floor control panel, but not directly to the car control panel. Similar to the conventional elevator systems the call of the elevator first calls the elevator. In some embodiments only in the elevator the first communication unit can establish a connection to the car control panel in order to control the elevator if and as desired. If the destination floor is previously pre-specified in the first communication unit, it is preferably directly submitted from the GIM of the floor control panel to the GIM of the car control panel and thus preferably via the car control panel to the control of the elevator such that no interaction between the smartphone and the car control panel or the GIM of the car control panel is necessary for submission of the destination floor from the first communication unit to the car control panel or its GIM. This process is comparable with embodiments of the system in the automatic operation mode (compare example 1). Preferably the determination of the distance between the first communication unit and the GIM of a car control panel is carried out in that the radio signal strength from indication radio signals emitted from the first communication unit, e.g. Bluetooth Low Energy Advertisements is determined by the GIM of the car control panel.

The system can be configured to establish a communication connection between the first communication unit and the second communication unit prior to the establishment of a communication connection by the system between the first communication unit and the third communication unit and/or between the second communication unit and the third communication unit. If, for example, the floor control panel and a car control panel are each equipped with a GIM, the system can be configured to establish a communication connection between the first communication unit (e.g. smartphone) carried by the user and the GIM of the floor control panel prior to the establishment of a communication connection between the first communication unit and the GIM of the car control panel and/or prior to an establishment of a communication connection between the GIM of the floor control panel and the GIM of the car control panel.

For example, the system can be configured to transmit a destination stored on the first communication unit that is carried by the user to the second communication unit, e.g. GIM assigned to the floor control panel, and subsequently from the second communication unit to the third communication unit, e.g. GIM assigned to the car control panel. The system can be particularly configured to transmit the destination that was transmitted to the third communication unit to the control of the elevator. The system is particularly preferably configured to use a wireless or wired connection or connection line between the car control panel and the control of the elevator that already existed prior to the retrofit of the elevator system with the inventive system.

The system is preferably configured to transmit a readiness request message (call of the elevator) that was transmitted to the second communication unit, e.g. a GIM assigned to the floor control panel by wireless or wired connection or connection line between the car control panel and the elevator control to the elevator control. Preferably the wireless or wired connection already existed prior to retrofitting the elevator system with the inventive system.

The communication connection between the first communication unit and the second communication unit can have a larger range than the communication connection between the second communication unit and the third communication unit and/or than a communication connection between the first communication unit and the third communication unit.

The system can be configured for automatic use such that the destination of the user that is e.g. pre-specified in the first communication unit or after the destination was input or selected by input in the first communication unit, no further user input of the user in the first communication unit is necessary prior to or during the use of the elevator for transporting the user to the destination by means of the elevator. If a destination floor is already adjusted in the first communication unit, it is preferably directly submitted from the second communication unit to the third communication unit such that in embodiments of the method or the system in the automatic operation (compare example one) no interaction between the first communication unit and the third communication unit for submission of the destination floor is necessary. Preferably, however, determination of the distance between the first communication unit and the communication unit is carried out preferably by measurement of the radio signal strength of the indication radio signals emitted by the first communication unit, e.g. Bluetooth-Low-Energy Advertisements.

BRIEF DESCRIPTION OF THE DRAWINGS

Additional features and embodiments of the invention can be derived from the dependent claims, the description and the drawings. The drawings show:

DETAILED DESCRIPTION

Figure 3:
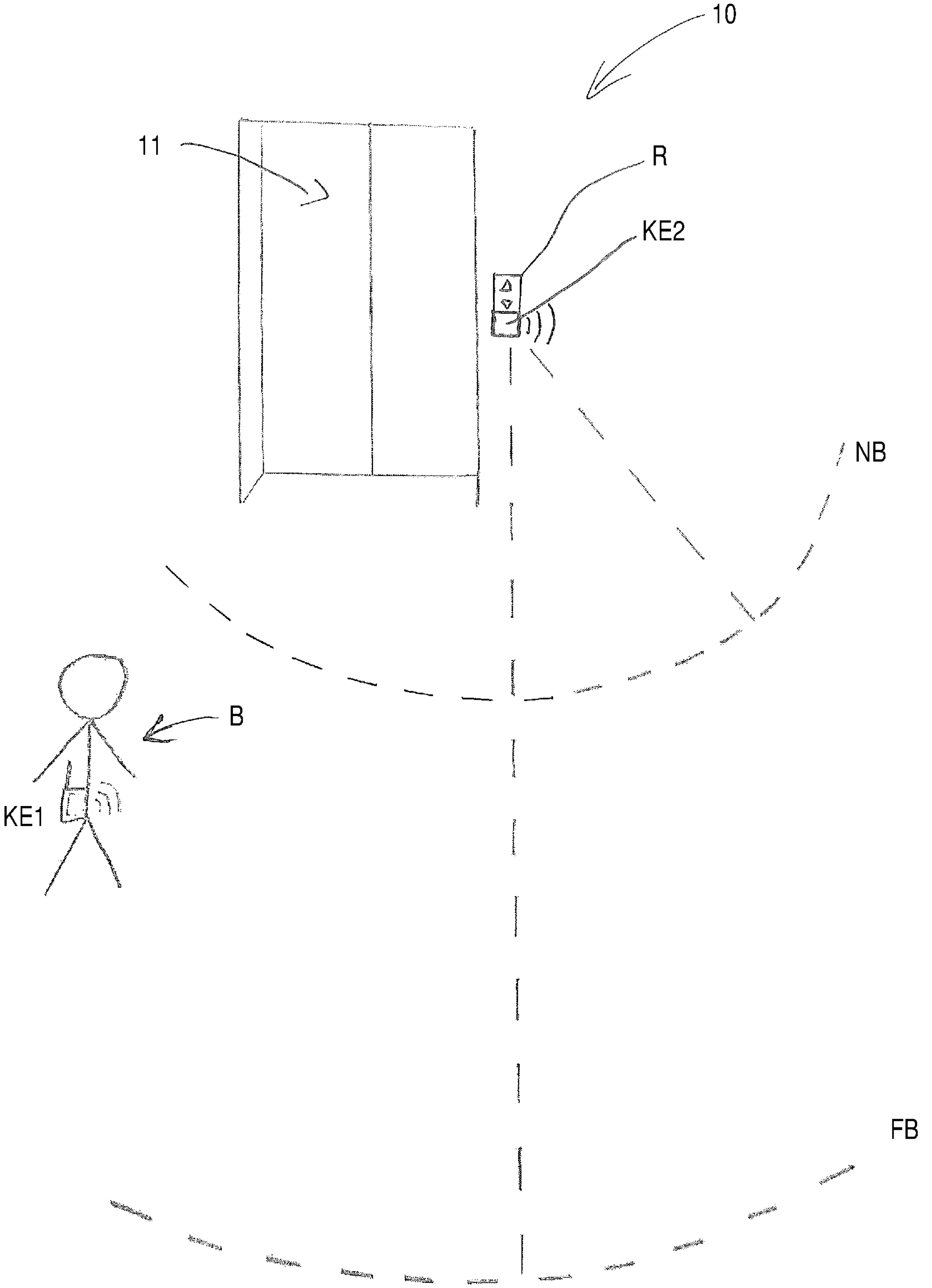
FIG. 3 an elevator system comprising a floor control panel that is equipped with a second communication unit of an exemplary inventive system, FIG. 4 the exemplary inventive system of FIG. 3 in another view that also illustrates a third communication unit of the inventive system with which a car control panel is equipped, FIG. 5 a flow diagram of an embodiment of a method, wherein embodiments of the inventive system are configured to carry out the method, FIGS. 6*a*, 6*b* and 6*c* embodiments of a method, wherein embodiments of the inventive system are configured to carry out these methods, FIG. 7 a detailed schematic view of communication units of exemplary inventive systems, FIG. 8*a* an example of a floor control panel of an existing elevator system that is connected with the control of the elevator via a connection device, FIG. 8*b* the floor control panel that is connected with the control of the elevator according to FIG. 8*a* after retrofit with a second communication unit of an exemplary inventive retrofit set, FIG. 9*a* an example of a car control panel of an existing elevator system that is connected with a control of the elevator via a connection device, FIG. 9*b* the car control panel that is connected with the control of the elevator according to FIG. 9*a* after retrofit with a second communication unit of an exemplary inventive retrofit set.
Figure 4:
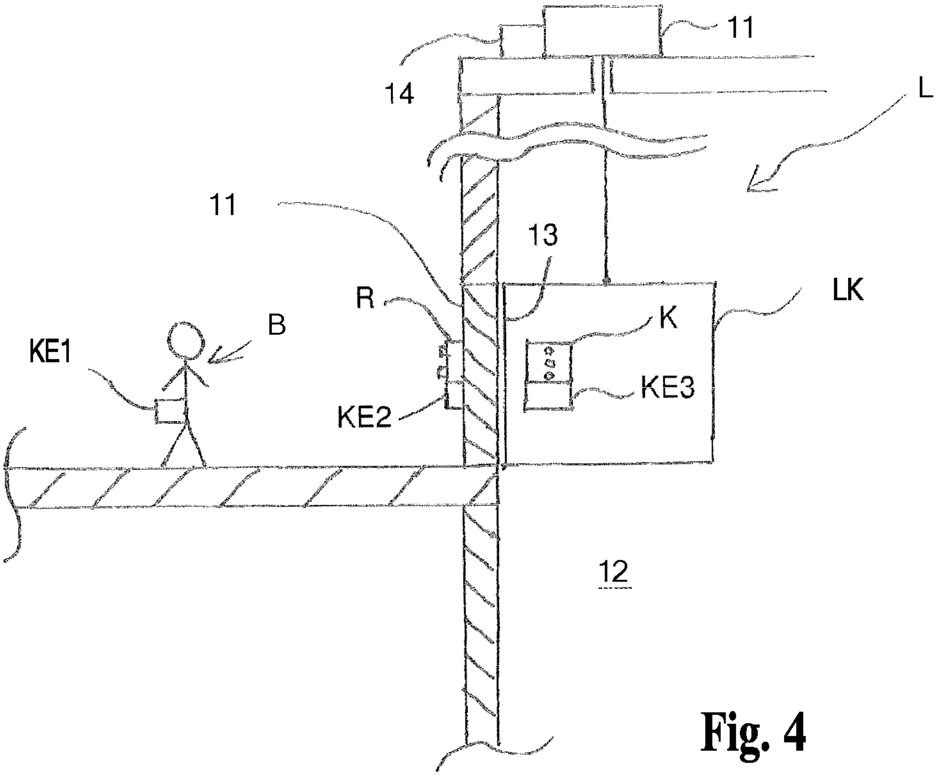
Figure 7:
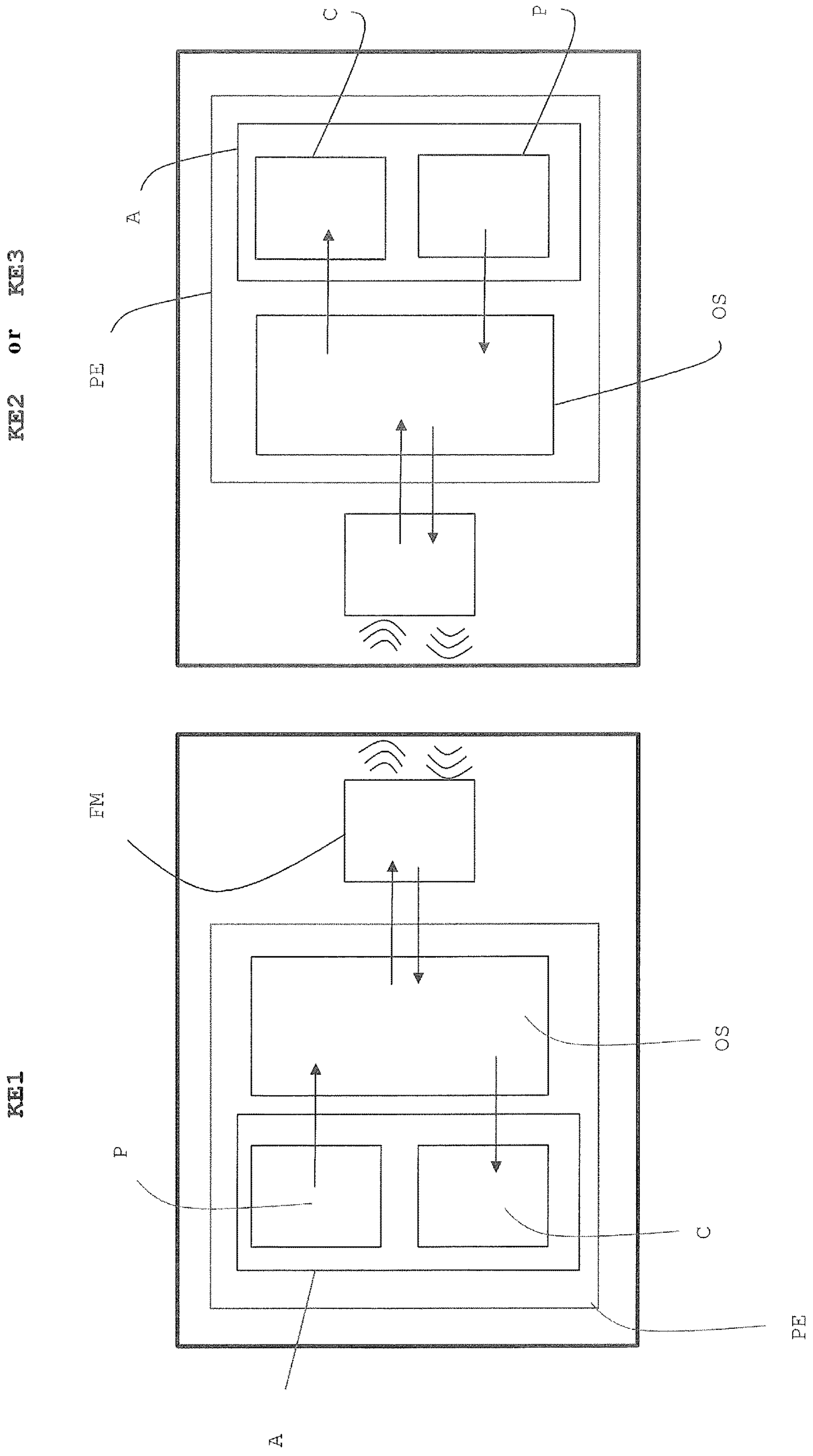

Embodiments of an inventive system 10 with a first communication unit KE1, a second communication unit KE2 and a third communication unit KE3 is illustrated in FIGS. 3 and 4. Examples of a first communication unit KE1 and the second communication unit KE2 are illustrated in FIG. 7.

The exemplary system 10 comprises a first communication unit KE1 that is carried by a user B of the system 10. The first communication unit KE1 can be particularly a smartphone, a tablet, a smartwatch, (smart) glasses, a bracelet, a mobile media player or another mobile device that can be carried by a user B. On the first communication unit KE1 an application A, briefly called App, is installed and able to be executed or run on the first communication unit. The first communication unit KE1 can be a device that is operated with an iOS or a watchOS or an Android or an Android Wear or a Wear OS or any other suitable operating system (OS) for mobile devices. The application A can be configured to run or cooperate with the respective operating system. On the first communication unit KE1 a destination, particularly a destination floor, can be stored by user B. In addition, it is possible that an identifier is stored on the first communication unit KE1 that may characterize an access authority of the user B, e.g. for private or non-public destinations.

The system 10 also comprises the second communication unit KE2 that is stationary and installed at or in the floor control panel R in proximity to an elevator shaft door 11 illustrated in FIGS. 3 and 4. The second communication unit KE2 can be connected according to the example with the floor control panel R and/or a wireless or wired connection device VR (compare also FIGS. 8*a*, 8*b*) between the floor control panel R and the control 14 of the elevator L or of the elevator system. Via the connection device VR the floor control panel R is able to submit commands to the control 14, e.g. a command to move the elevator car LK in the respective floor, on which the floor control panel R is arranged (call of the elevator) and/or a command to open the elevator shaft door 11 and the car door 13, if the elevator car LK has arrived on the floor. The control 14 is connected with a motor M to control the motor M, particularly for moving the elevator car LK.

In the elevator car LK a third communication unit KE3 is installed and particularly at or in the car control panel K and connected with the car control panel K. The third communication unit KE3 can be connected, for example, with the car control panel K and/or a wireless or wired connection device VK (compare also FIGS. 9*a*, 9*b*) between the car control panel K and the control 14 of the elevator L or the elevator system. Via this connection device VK the car control panel K can submit commands to the control 14, particularly a command to move the elevator car LK to the destination floor and/or a command to close the elevator shaft door 11 and the car door 13.

The first communication unit KE1, the second communication unit KE2 and the third communication unit KE3 are preferably configured to communicate via a wireless communication protocol, e.g. by means of Bluetooth technique and particularly by means of Bluetooth-Low-Energy technique. Communication means the sending of data by one communication unit KE1, KE2 or KE3 and the receipt of the data by another communication unit KE1, KE2 or KE3.

At least one of the communication units KE1, KE2 or KE3 is preferably configured to emit indication radio signals FS according to the Bluetooth-Low-Energy technique or standard. The indication radio signals FS are also called Advertisements. Peripheral and Central are particular roles in the Bluetooth-Low-Energy (BLE) technique or standard. The communication unit KE1, KE2, KE3 that sends Bluetooth-Low-Energy Advertisements operates in the peripheral role. The communication unit KE1, KE2, KE3 that scans for emitted BLE-Advertisements in the vicinity in order to receive them, operates in the central role. The first communication unit KE1 and the second communication unit KE2 are preferably configured to operate as Peripheral P and also as Central C (compare FIG. 4). In addition, the third communication unit KE3 can be configured to operate as Peripheral P and/or as Central C.

FIG. 3 illustrates a radio range FB about the second communication unit KE2. If the first communication unit KE1 is within the radio range FB, the first communication unit KE1 is able to receive indication radio signals FS, particularly BLE-Advertisements from the second communication unit KE2. Alternatively or additionally, the second communication unit KE2 is able to receive indication radio signals FS, particularly BLE-Advertisements from the first communication unit KE1. Alternatively or additionally, a communication connection that particularly corresponds to the BLE-standard can be established or maintained between the first and the second communication units KE1, KE2. The range of the radio signals defining the radio range FB can be, for example, between 10 to 50 meters. The range is larger than the range of a near field communication. The range can be preferably arbitrarily adjusted or configured.

A near range NB is defined within the radio range FB about the second communication unit KE2. The entering of the user into the near range NB of the second communication unit KE2 can be, e.g. determined by radio signal strength measurement. If the entering of the user in the near range NB was determined, the system 10 can initiate particular actions or operations.

Figure 5:
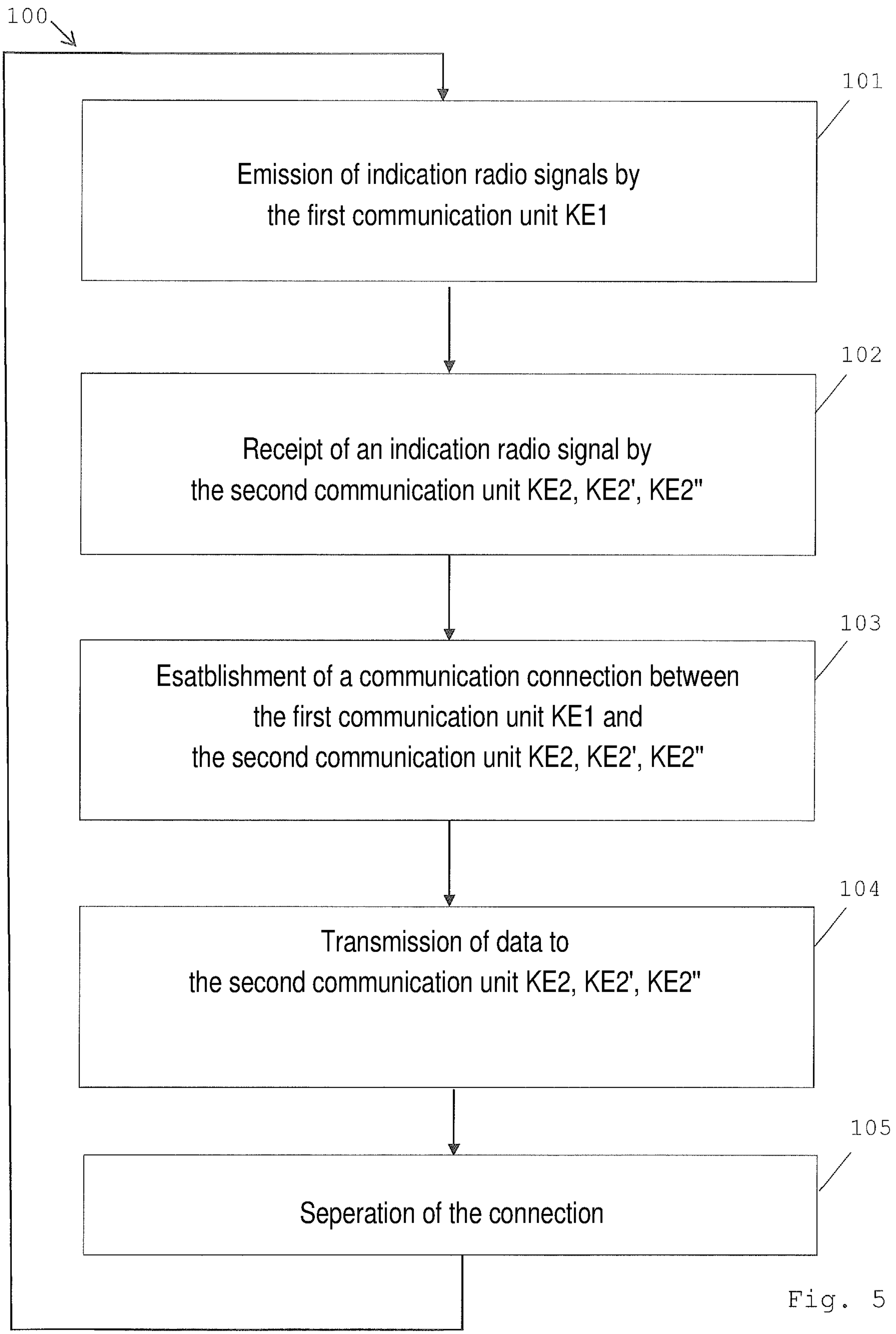

In a first embodiment of the inventive system it is configured to carry out an exemplary inventive method 100 as illustrated in FIG. 5. The first communication unit KE1 carried by the user B emits indication radio signals FS, preferably BLE-Advertisements (step 101), while the application A is in the background and executes program code or while the application A is in the background and does not execute program code or while the application A is in a status (not running) in which the application A was transitioned after being terminated by the operating system in order to save energy after having been started by the user. The application A can be particularly an iOS application and can be accordingly in the status background, suspended or not running. Or the application A can be, e.g. an Android application or a watchOS application or an Android Wear application or a Wear OS application and can be in corresponding statuses. Thus, the App A particularly does not run in the foreground. The user input is at this moment not necessary. If the first communication unit KE1 sends BLE-Advertisements, it operates as Peripheral. The first communication unit KE1 is preferably configured to concurrently or quasi concurrently operate as Central C and to scan for BLE-Advertisements.

The indication radio signals, particularly the BLE-Advertisements, contain preferably no identifier for identification of the user B and/or the first communication unit KE1 and/or no data about the destination of the user B, particularly a destination floor.

The user B and thus the first communication unit KE1 approaches the second communication unit KE2 such that the first communication unit KE1 is in the radio range FB of the second communication unit KE2. As a result, the second communication unit KE2 can receive the indication radio signal FS submitted by the first communication unit KE1. The second communication unit KE2 is configured to scan for indication radio signals FS in order to receive them. The second communication unit KE2 thus operates as Central C in this scanning operation mode. The indication radio signal FS is received by the second communication unit KE2 in step 102. The indication radio signal FS from the first communication unit KE1 may not contain an identifier that indicates at least one of an access authority of the user B or data about the destination, particularly the destination floor. Depending on the embodiment of the first communication unit KE1 and/or the status of the App A, such an identifier may not be contained in the indication radio signal FS. However, the indication radio signal FS may contain an indicator that allows the second communication unit KE2 to determine whether the first communication unit KE1 is a device that is able to contain access authority information of the user B or that is able to have an App A installed that allows a preselection for the at least one next method step. For example, the indicator may be a hint to the operating system that operates the first communication unit KE1.

If the App A runs in the background (status: background or suspended) or was terminated by the operating system for energy saving reasons (status: not running), the first communication unit KE1 can preferably be configured to emit indication radio signals FS, particularly if the App A is in the status suspended or not running. The emission of indication radio signals can be initiated by the operating system of the first communication unit KE1. The App A can command the operating system OS, for example, to emit the indication radio signals FS prior to the termination of the App A by the operating system OS.

As necessary and under the condition that the second communication unit KE2 has determined that the first communication unit KE1 is a device that may contain an access authority of the user B or that may have an App A installed, the second communication unit KE2 tries to establish a communication connection, particularly BLE-connection to the first communication unit KE1. Because the App A on the first communication unit KE1 is running in the background or has been terminated by the operating system for energy-saving reasons, the connection will be automatically established (step 103). If necessary, the App A is transitioned into the condition in which the App A is running in the background and executing program code (status background) in order to establish a connection between the first communication unit KE1 and the second communication unit KE2 for data exchange by means of the App A. The transition to this status may be carried out from any other status, in which the App A can be switched, particularly the statuses suspended or not running.

Via the connection, data from the first communication unit KE1 are transmitted to the second communication unit KE2 (step 104). Via the connection it is also possible to transmit data from the second communication unit KE2 to the first communication unit KE1. The data transmission can particularly be carried out by accessing or requesting Bluetooth-Low-Energy values, particularly characteristics, that are stored in the Bluetooth stack of the first communication unit KE1. Such characteristics can be actively accessed or requested by the second communication unit KE2. For the user B a push message can be output on a display (not illustrated) of the first communication unit. The output of the push message can be additionally dependent on whether the user B has entered the near range NB about the second communication unit KE2. For example, a message can be transmitted to the first communication unit KE1 (e.g. smartphone) that an elevator L is in the vicinity.

The message can contain the name or any other identifier and/or an indication about the estimated distance. The distance can be determined, for example, by means of a Bluetooth-Low-Energy radio signal strength measurement. The estimation of the distance can be additionally dependent on whether the user B has entered the near range NB and about the second communication unit KE2.

Based on the transmitted data, the second communication unit KE2 can determine, for example, that the user B has the request to use the elevator L and/or can determine the destination, particularly the destination floor to which the user B desires to travel. For example, the user B may have configured the first communication unit KE1 or the App A respectively that an elevator L shall be automatically called, if the user B approaches a second communication unit KE2. Alternatively or additionally, the user B may have specified a desired destination or a destination floor, e.g. fourth floor, on the first communication unit KE1 or the App A. If the user B has the request to travel, the call of the elevator L to the floor in which the user B is located, is preferably automatically executed. Particularly, a user input in the first communication unit KE1 is not necessary between the point of time where the user B has approached the second communication unit KE2 such that it can receive Bluetooth Advertisements from the first communication unit KE1 until inclusively the call of the elevator L and/or until inclusively the transmission of the destination floor to the elevator control. It is particularly not necessary that the App A runs in the foreground mode. In a modification of the method the possibility for the user may be provided to decide whether the elevator L shall be called and to input the decision in the first communication unit KE1. For this the App A may be transitioned in the foreground mode.

As illustrated by the arrow in FIG. 5, the first communication unit KE1 may be configured to particularly automatically initiate the emission of BLE-Advertisements or other indication radio signals FS after the communication connection has been established between the first communication unit KE1 and the second communication unit KE2. This allows, e.g. one of the following: Establishing a communication connection between another second communication unit KE2 on another floor; Establishing a communication connection with the third communication unit KE3 in the elevator car LK; Determination of the distance between the first communication unit KE1 and the second communication unit KE2 and/or between the first communication unit KE1 and the third communication unit KE3. In order that the first communication unit KE1 is able to emit indication radio signals FS, the connection between the first communication unit KE1 and the second communication unit KE2 may potentially be terminated previously by the first communication unit KE1 or the connection may be interrupted by removing of the first communication unit KE1 out of the radio range FB (step 105, interruption of the connection). The resending can be initiated without user input, particularly if the App A operates in the background (status: background or suspended).

Figure 6A:
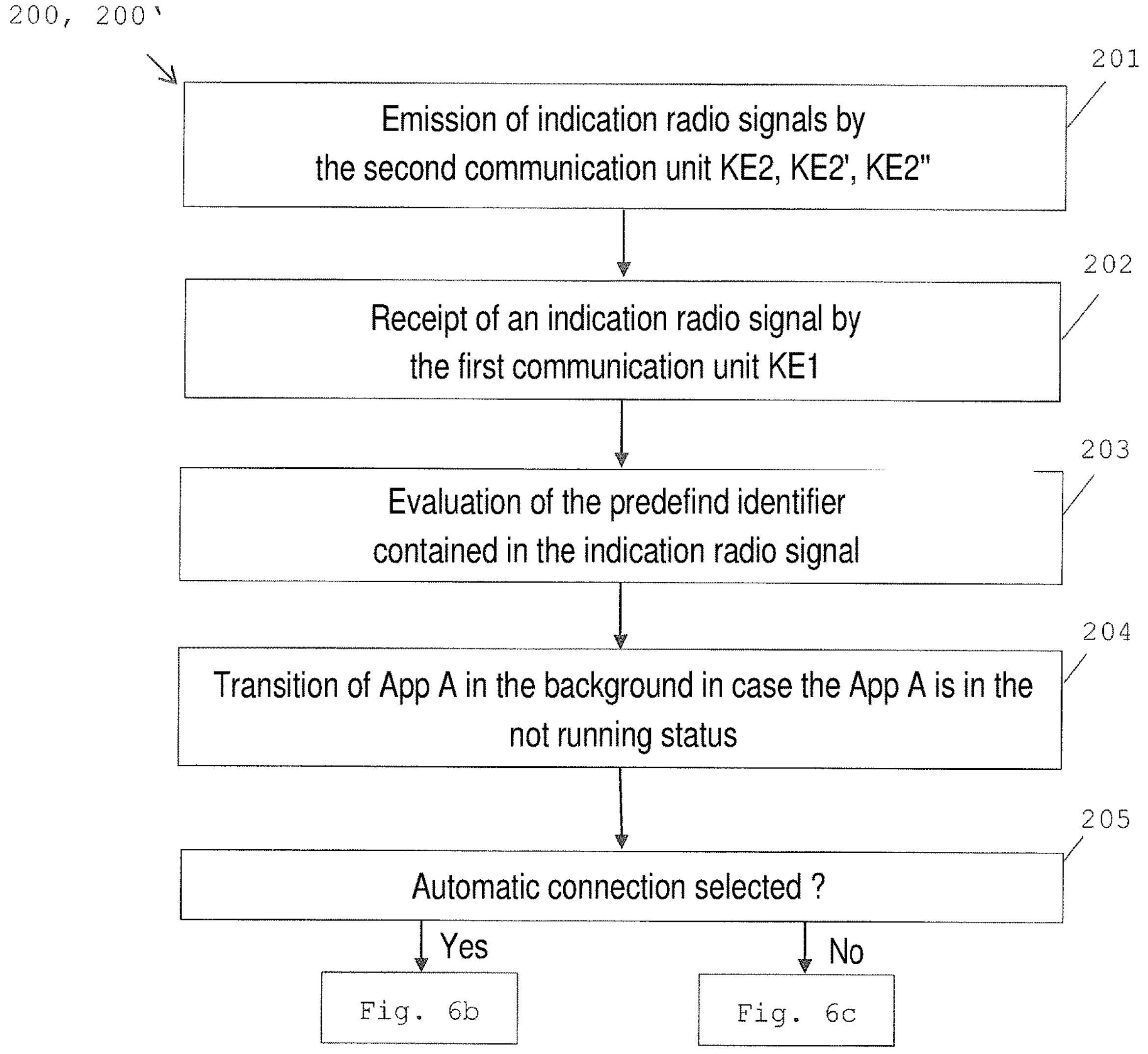
Figure 6B:
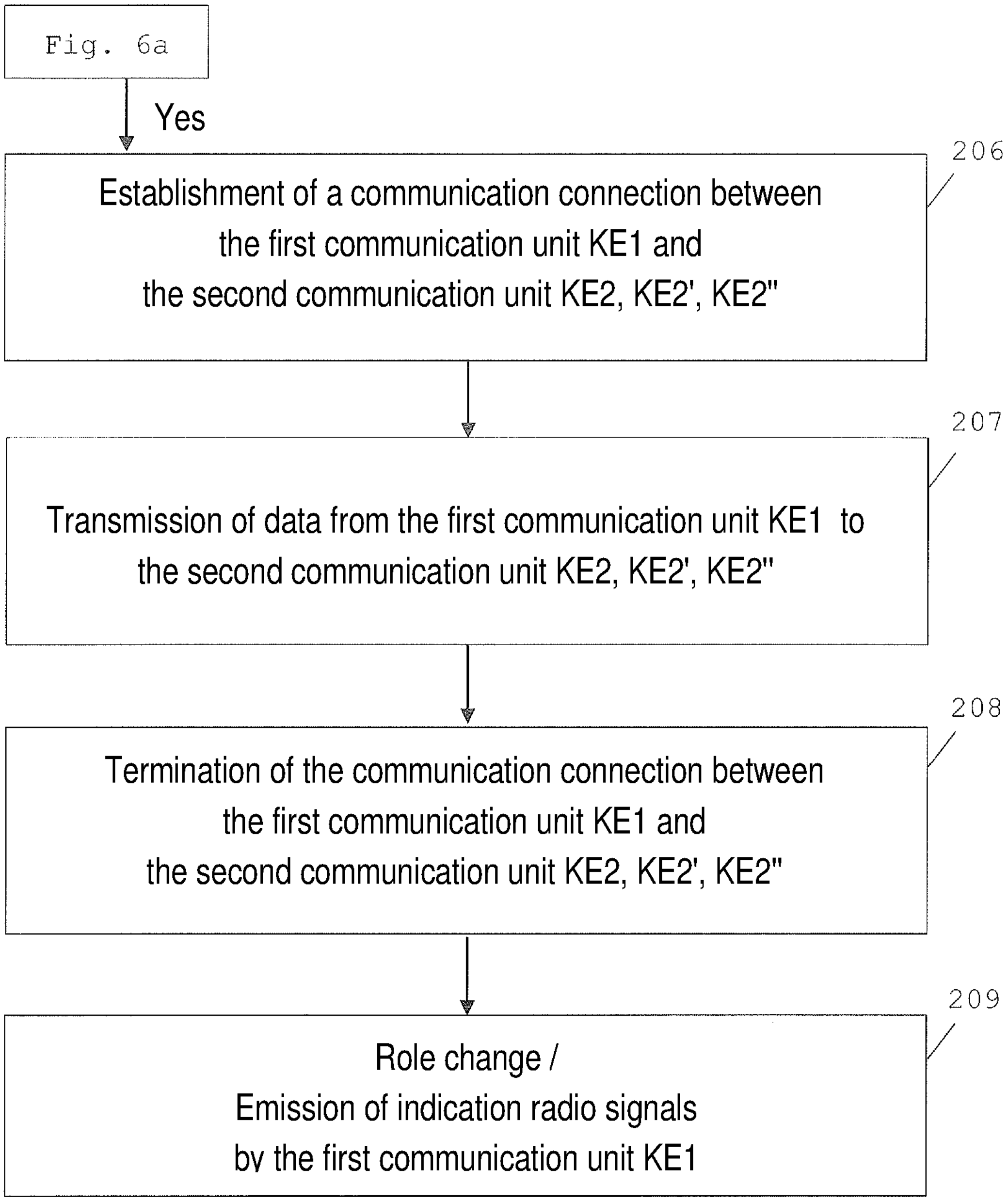
Figure 6C:
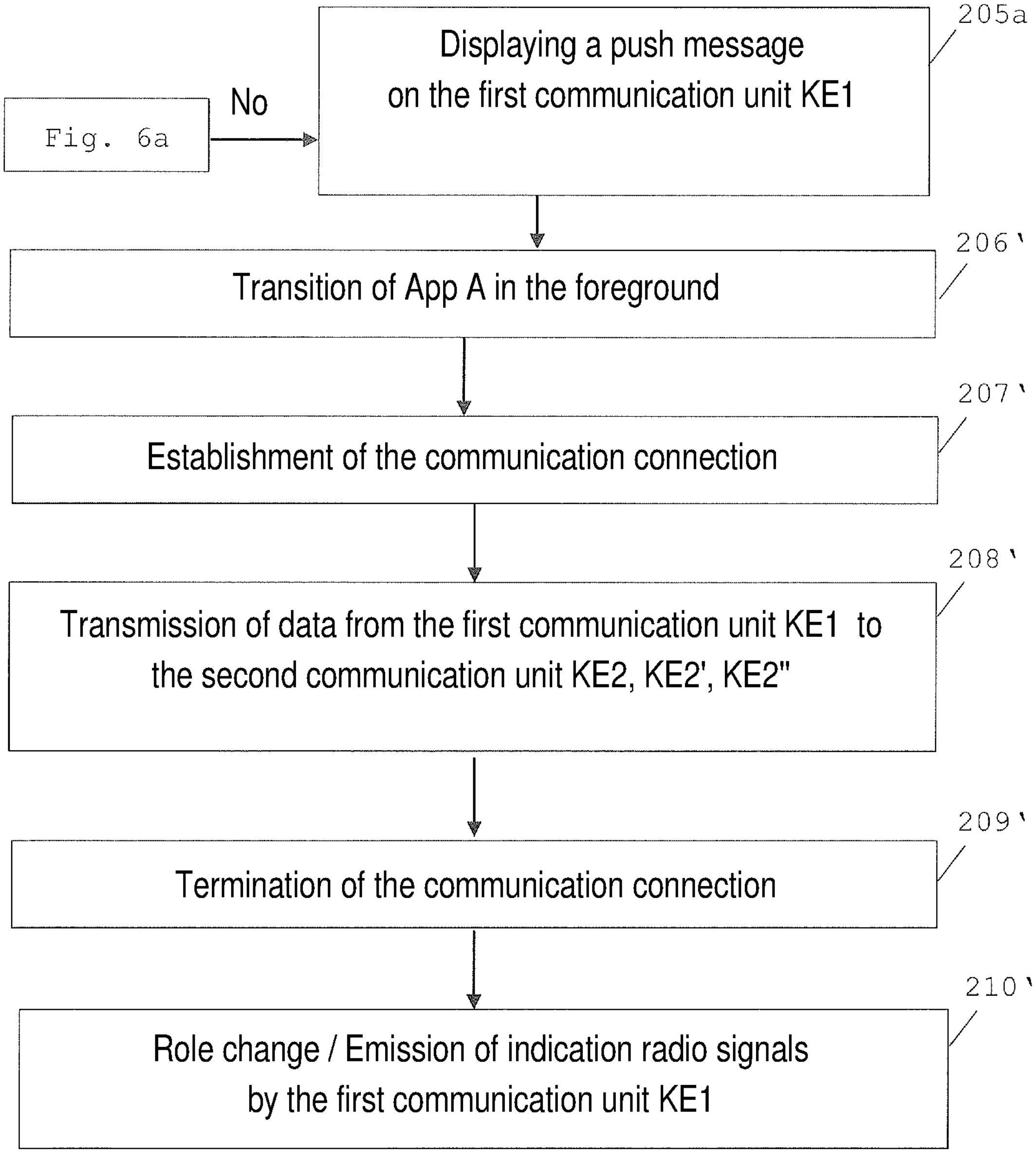

Alternatively or additionally, the exemplary inventive system 10 according to FIGS. 3 and 4 can be configured to carry out an exemplary method 200 according to FIGS. 6*a*, 6*b* and/or a method 200' according to FIGS. 6*a*, 6*c*.

According to the flow diagram illustrated in FIG. 6*a*, the second communication unit KE2 sends indication radio signals FS (step 201). Particularly the indication radio signals FS can be BLE-Advertisements such that the second communication unit KE2 operates as Peripheral P. The indication radio signals FS can comprise a predefined identifier of the second communication unit KE2. The identifier, particularly a UUID, can be specified particularly by the provider of the system 10. The identifier can particularly correspond to a UUID according to the Bluetooth-Low-Energy technique or standard. For example, the UUID can have a length of 128 bit. Preferably the interval, in which indication radio signals FS are emitted, can be adjusted or configured.

An emitted indication radio signal FS is received by the first communication unit KE1 (step 202) while the application A is not running in the foreground mode. The application A can be particularly in the background status or in the suspended status or in the status not running. If the App A was terminated by the operating system to save energy (status: not running), the operating system OS can take over the function of the App A to scan for indication radio signals FS, particularly those having the predefined identifier. Particularly the App A is configured to inform the operating system OS of the first communication unit KE1 for which identifiers, particularly UUIDs, shall be searched during scanning for indication radio signals FS. The first communication unit KE1 is preferably in the row of the Central C according to the BLE-technique or standard and is thus configured to scan for Advertisements with the predefined identifier. The first communication unit KE1 is preferably configured to concurrently or quasi concurrently operate as Peripheral P, i.e. send out BLE-Advertisements.

If the user B together with the first communication unit KE1 enters the radio range FB, the first communication unit KE1 can receive the indication radio signal FS. If a predefined identifier is transmitted together with the indication radio signal FS received by the first communication unit KE1, the predefined identifier can be evaluated whether a connection shall be established with the second communication unit KE2 (step 203).

If the indication radio signal FS was received and a connection to the second communication unit KE2 has to be established and the App is still not in the background, but was terminated by the operating system (status not running), the application A is transitioned in the background status by the operating system OS (step 204). Initiated by the application A, the first communication unit KE1 can, e.g. output a message to the user B, particularly a push message. For example, a message can be submitted to the user B or the first communication unit respectively that the elevator L is in the proximity.

The message can contain the name of the elevator L and/or an indication about the estimated distance. The distance can, for example, be determined by a Bluetooth-Low-Energy radio signal strength measurement. The display of the message can be dependent from whether the user B has entered the near range NB about the second communication unit KE2.

The App A can now evaluate whether data are stored, particularly on the first communication unit KE1, e.g. by means of the App A, that have to be automatically transmitted to the second communication unit KE2. For example, App A may evaluate whether an automatic call of the elevator and/or an automatic submission of a destination floor is adjusted on or requested by the first communication unit KE1. Alternatively or additionally, the App A may determine whether the establishment of a connection between the first communication unit KE1 and the second communication unit KE2 shall be carried out only with acknowledgement of the user (user input) or automatically without user input (step 205).

If data are present, particularly on the first communication unit KE1 for automatic submission to the second communication unit KE2 (e.g. commands such as "call elevator automatically" or "transmit destination floor automatically to the second and/or third communication unit) a connection between the first communication unit KE1 and the second communication unit KE2 (compare FIG. 6*b*) is automatically established without the requirement of any user input while the App A is in the background (step 206).

Via the connection, data are transmitted to the second communication unit KE2 (step 207). For example, a command may be transmitted to the second communication unit KE2 that has to be submitted to the control of the elevator to provide the elevator car LK in this floor. Additionally or alternatively, the destination and particularly the destination floor can be submitted to the second communication unit KE2 via this connection. Alternatively or additionally, an identifier can be submitted to the second communication unit KE2 that characterizes the access authority of the user B for the elevator L and/or for the destination floor. These operations can be preferably respectively carried out while the App A is in the background mode without any need for user action.

It is preferred to interrupt the connection between the first communication unit KE1 and the second communication unit KE2 after the data transmission, as illustrated in FIG. 3*b* (step 208). The termination can be initiated by the first and/or second communication unit KE1, KE2. Alternatively, the interruption of the communication can occur by removing the first communication unit KE1 from the radio range FB of the second communication unit KE2 such that the connection cannot be maintained.

After interruption of the connection, the first communication unit KE1 can automatically change its role and can operate as Peripheral P according to the Bluetooth-Low-Energy technique or standard. As a result the first communication unit emits BLE-Advertisements as indication radio signals FS (step 209). As an example, this may be carried out in order to create a connection between another second communication unit KE2 on another floor and/or with the third communication unit KE3 in the elevator car LK and/or in order to determine the distance between the first communication unit KE1 on one side and at least one of the second communication unit KE2 and the third communication unit KE3 on the other side. The first communication unit KE1 can particularly establish a connection with another second communication unit or with the third communication unit as described with reference to FIG. 5. Preferably the first communication unit operates concurrently or quasi concurrently to the operation as Peripheral P also as Central C in order to scan for BLE-Advertisements.

If during the method 200' according to FIG. 6*a*, it has been determined that a user input is required and/or that the automatic connection creation and/or the automatic call of the elevator L is not selected and/or no destination floor for automatic transition is stored, preferably no connection is established at first.

A push message can be output to the user B via the first communication unit KE1 (step 205*a*) in order to initiate the user B to transition the App A in the foreground.

If the user B opens the App A, it leaves the background mode or it is transitioned into the foreground status (step 206') and the first communication unit KE1 can establish a connection with the second communication unit KE2 (step 207'). For this preferably the first communication unit KE1 operates as Central C and the second communication unit KE2 operates as Peripheral P.

Via the connection at least data, particularly a command to call the elevator L and/or the destination floor of the user B, can be submitted from the first communication unit KE1 to the second communication unit KE2. Preferably also data can be submitted from the second communication unit KE2 to the first communication unit KE1. Alternatively or additionally, an identifier may be submitted from the first communication unit KE1 to the second communication unit KE2 as confirmation for the access authority of the user B (step 208'). An option such as "call elevator" or possible destination floors can be displayed to the user B by means of the first communication unit KE1. If the user B inputs or confirms the command "call elevator" and/or inputs the destination or destination floor in the first communication unit the respective command to call the elevator L and/or the destination floor can be submitted to the second communication unit KE2 (step 208'). The second communication unit KE2 can transfer this command and/or this destination to the control of the elevator such that the elevator L is provided. In preferred embodiments only the elevator L is called via the second communication unit KE2 and the submission of the destination floor is carried out by a submission of the second communication unit KE2 to the third communication unit KE3 and/or by a submission of the first communication unit KE1 to the third communication unit KE3.

The connection between the first communication unit KE1 and the second communication unit KE2 can now be terminated (step 209'). This termination can be carried out actively by the second communication unit KE2 and/or the first communication unit KE1. Alternatively the interruption of the connection can occur by removing the first communication unit KE1 from the radio range FB of the second communication unit KE2 such that the connection can no longer be maintained.

After termination or interruption of the connection, the first communication unit KE1 can preferably automatically without the need for user input change the role and operate as Peripheral P according to the Bluetooth-Low-Energy technique or standard such that the first communication unit KE1 emits BLE-Advertisements as indication radio signals FS (step 210'). The first communication unit KE1 can particularly establish a connection with another second communication unit KE2' or the third communication unit KE3 based on a method as described with reference to FIG. 5. Preferably the first communication unit KE1 operates concurrently or quasi concurrently to the operation as Peripheral P also as Central C in order to scan for BLE-Advertisements.

In embodiments of the system 10 or methods 100, 200, 200' the elevator L can be called any time manually via operation of the floor control panel R. Embodiments are preferred that operate without the need for user input in the first communication unit KE1, if the first communication unit KE1 is located inside the radio range FB of the second communication unit KE2.

FIG. 7 shows an embodiment of the first communication unit KE1. The first communication unit comprises a processor unit PE and a radio module FM for sending and/or receiving of radio signals. The processor unit PE processes the commands of the operating system OS and/or the application A. The two blocks C and P in the App A illustrate the functions or roles of the first communication unit KE1 as Central C and as Peripheral P. The first communication unit KE1 is preferably configured to operate concurrently or quasi concurrently as Peripheral P and as Central C. The radio module FM can, for example, only contain a Bluetooth chip such that sending and receiving is not possible concurrently. In order to operate quasi concurrently, it is switched with high frequency between transmission and receipt. The first communication unit KE1 is configured to carry out the method according to FIG. 5 as well as a method according to FIGS. 6*a* to 6*c* by means of the App A. As illustrated by arrows between the block OS that illustrates the operating system OS and the radio module FM, the operating system OS may cause the radio module FM to emit indication radio signals FS, particularly BLE-Advertisements, even though the App A was terminated by the operating system OS for energy-saving reasons or if the App A is in the suspended status. In addition, the operating system OS may scan for emitted indication radio signals FS, particularly BLE-Advertisements, particularly those containing a predefined identifier (e.g. predefined UUID), even though the App A was terminated by the operating system OS for energy-saving reasons or in the suspended status. These functions of the operating system OS may be caused by the App A and the App A may also determine the operating system OS, the at least one predefined identifier for which the operating system OS has to scan. The second communication unit KE2 and the third communication unit KE3 can be configured in a similar manner as illustrated in FIG. 7 and can particularly operate as Central C as well as Peripheral P.

Preferably the connection is used that was established first. For example, if the connection that was established by the second communication unit KE2 operating as Central C to the first communication unit KE1 operating as Peripheral P, this communication is used subsequently. Otherwise if a connection is established first by the first communication unit KE1 operating as Central C to the second communication unit KE2 operating as Peripheral P, this communication is subsequently used. However, other modified embodiments are also possible. It is, for example, possible that the first communication unit KE1 receives an identification radio signal FS from the second communication unit KE2 during scanning, before the second communication unit KE2 is able to receive the indication radio signal FS from the first communication unit KE1, the connection may be established by the first communication unit KE1 as Central C (compare FIGS. 6*a* to 6*c* as an example). If the second communication unit KE2 receives the indication radio signal FS from the first communication unit KE1, prior to this the connection is established by the second communication unit KE2 as Central C (compare for example FIG. 5). In this manner a connection can be quickly established between the first communication unit KE1 and the second communication unit KE2, even though the application A on the first communication unit KE1 is in the background and does not execute program code or is in a status, in which it was terminated by the operating system OS for energy-saving reasons (status suspended or not running). In these statuses the operating system OS of the first communication unit KE1 takes over the function of scanning for indication radio signals FS, particularly with the identifier predefined by the provider of the system 10 and the emission of indication radio signals FS.

According to at least one of the methods explained above, only a readiness request message may be submitted from the first communication unit KE1 to the second communication unit KE2 or also the destination of the user B, particularly the destination floor, can be submitted to the second communication unit KE2. The readiness request message may comprise or consist of the command to move the elevator to the floor, where user B is located and/or the command to open the elevator shaft door and the car door. The data about the destination floor can be transmitted from the second communication unit KE2 to the third communication unit KE3. For example, this can be carried out by one of the methods described above for the automatic transmission of data. As an alternative, the destination message can be transmitted from the first communication unit KE1 to the third communication unit KE3, wherein the first communication unit KE1 can, e.g. automatically connect with the third communication unit KE3 corresponding to a method according to FIG. 5 or according to FIG. 6*a*, 6*b*. Alternatively, the user B may be required to input the destination in the first communication unit KE1 that can be subsequently transmitted from the first communication unit KE1 to the third communication unit KE3 corresponding to one of the methods according to FIGS. 6*a*, 6*c*.

In preferred embodiments a destination message is transmitted to the third communication unit KE3 or from the third communication unit KE3 to the control 14 of the elevator L, only under the condition that the user B carrying the first communication unit KE1 is located in the elevator car. For this determination the radio signal strength between the first communication unit KE1 and the third communication unit KE3 can be evaluated. Particularly the radio signal strength of radio signals emitted from the first communication unit KE1, e.g. indication radio signals FS, received by the third communication unit KE3, is evaluated by the third communication unit KE3. If the radio signal strength of radio signals received by the third communication unit KE3 is less than a predefined threshold, it can be determined that the distance between the first communication unit KE1 and the third communication unit KE3 is so small that the first communication unit KE1 is inside the elevator car. For the distance determination or the presence determination of the user B in the car the establishment of a connection between the first communication unit KE1 and the third communication unit KE3 that would allow a data transmission is not necessary and is preferably not carried out.

Figure 1:
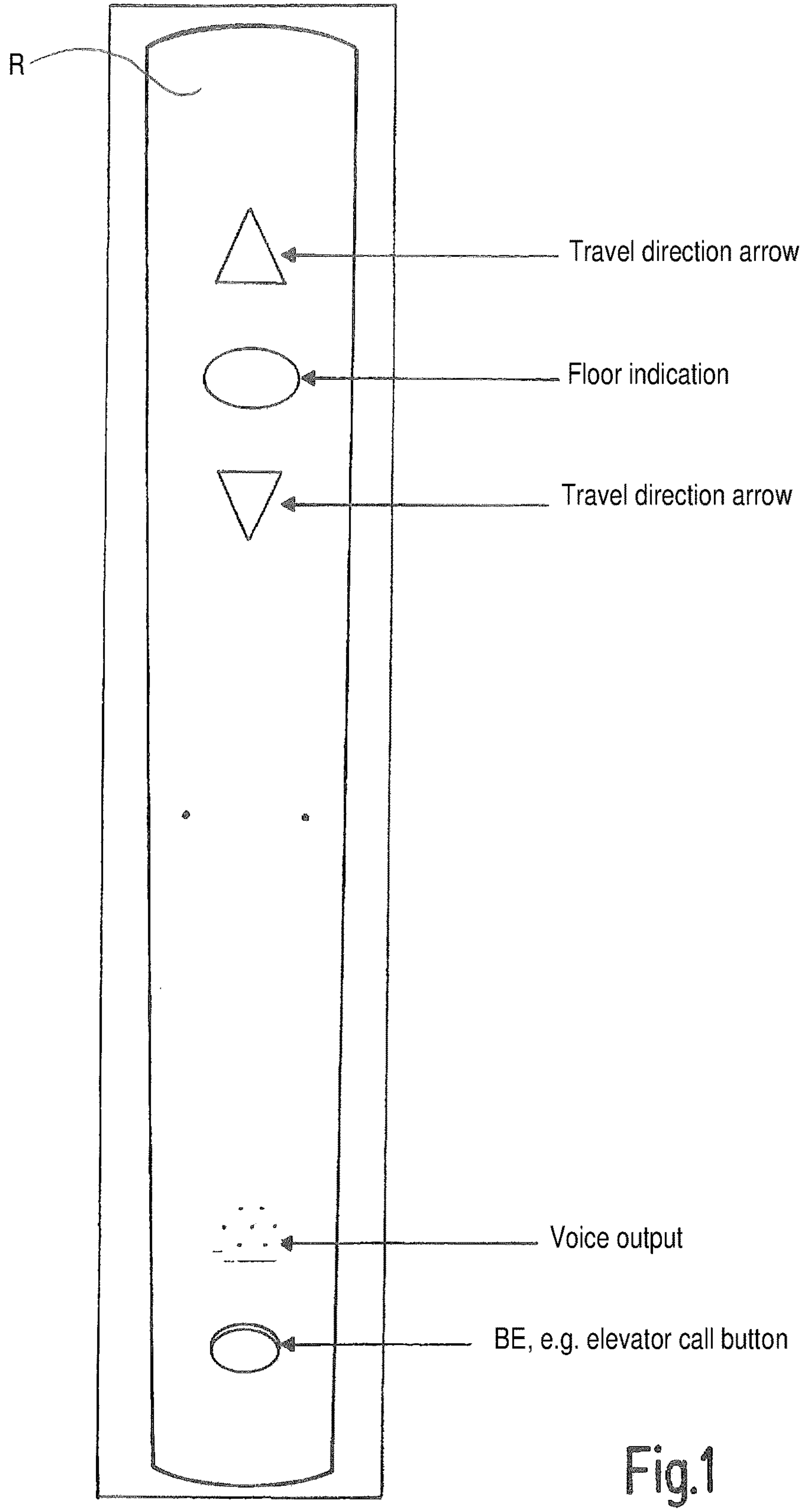
FIG. 1 an example of a floor control panel.
Figure 2:
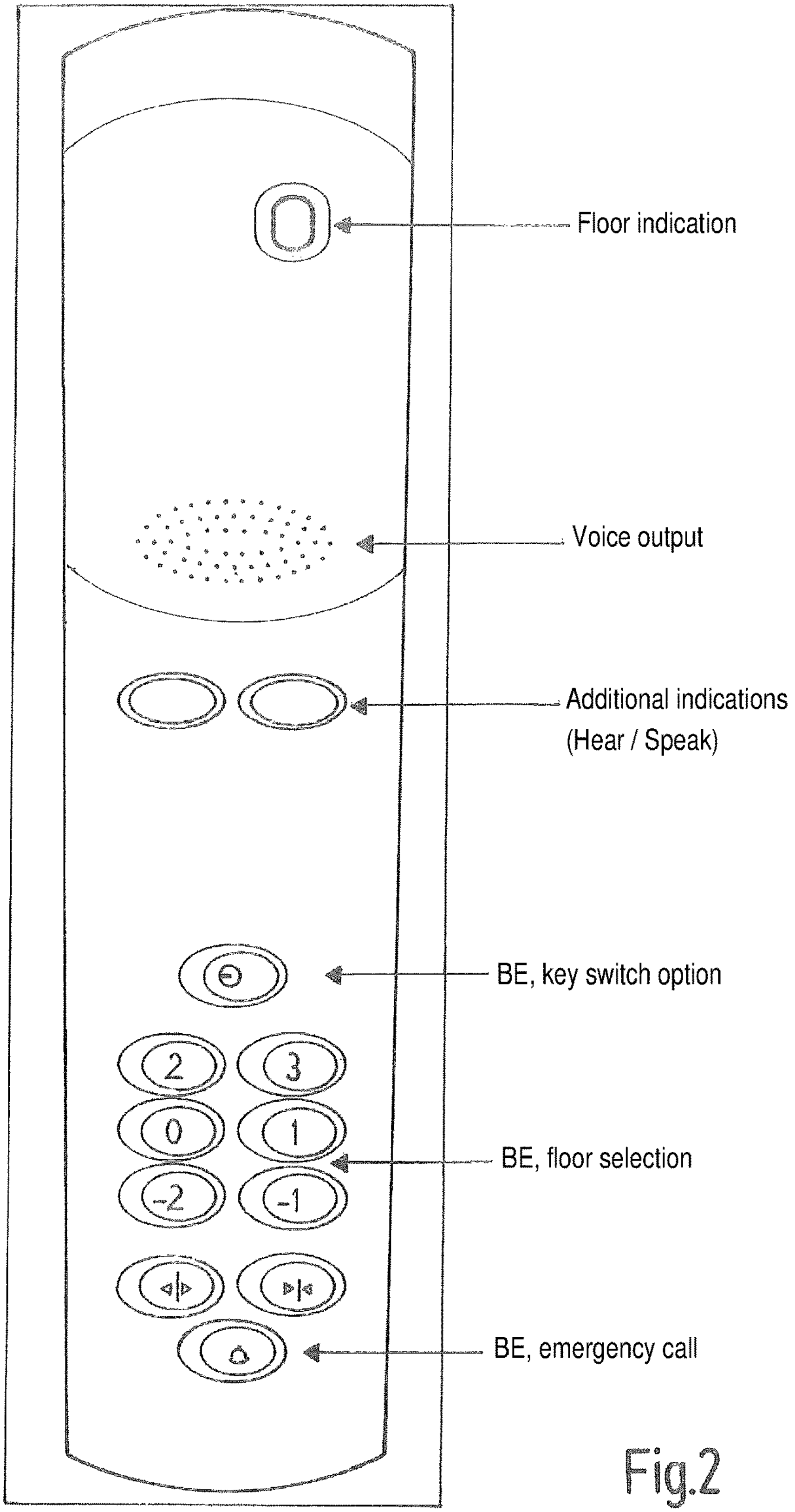
FIG. 2 an example of a car control panel.

The retrofit set according to the invention for retrofit of an already installed elevator system in a building comprises at least a second communication unit KE2 that is assigned to the floor control panel R (compare for example FIG. 1) and at least one third communication unit KE3 that is assigned to the car control panel K (compare for example FIG. 2). In addition, preferably an App A is provided that a user B can install on the first communication unit KE1, e.g. a smartphone or another mobile device.

Figure 8A:
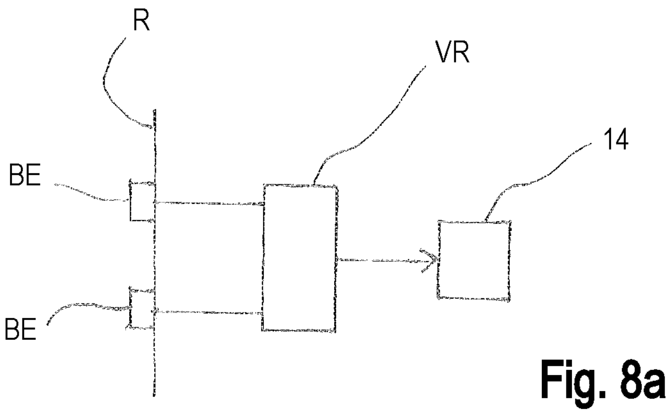

As it is exemplarily and schematically illustrated in FIG. 8*a*, the possibility to enter a readiness request (call of the elevator) and/or a destination request in the floor control panel R of the elevator system already existed in the elevator system installed in a building prior to the retrofit with the inventive retrofit set. The floor control panel R may have provided one or more operation elements BE, e.g. buttons, a touchscreen or a microphone for a voice input for this purpose. Between the operation elements BE and the control 14 of the elevator L a connection device VR already existed prior to the retrofit for submission of input readiness requests to the control 14 of the elevator.

Figure 8B:
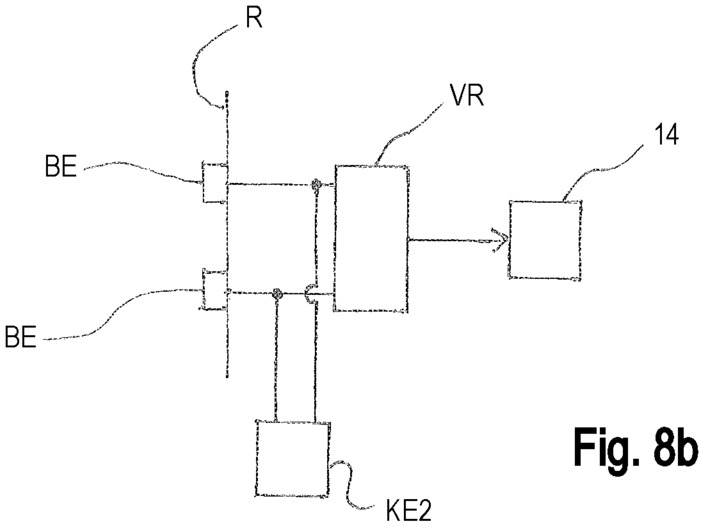

The second communication unit KE2 of the inventive retrofit set is preferably configured to be connected with the floor control panel R and/or the connection device VR such that the readiness request input in the second communication unit KE2 via the first communication unit KE1 can be transmitted via the connection device VR of the existing elevator system to the control 14 of the elevator. FIG. 8*b* schematically illustrates the elevator system according to FIG. 8*a* that is retrofit with an exemplary second communication unit KE2 connected via the connection device VR with the control 14 in order to submit a control command, particularly the call of the elevator to the control 14.

Figure 9A:
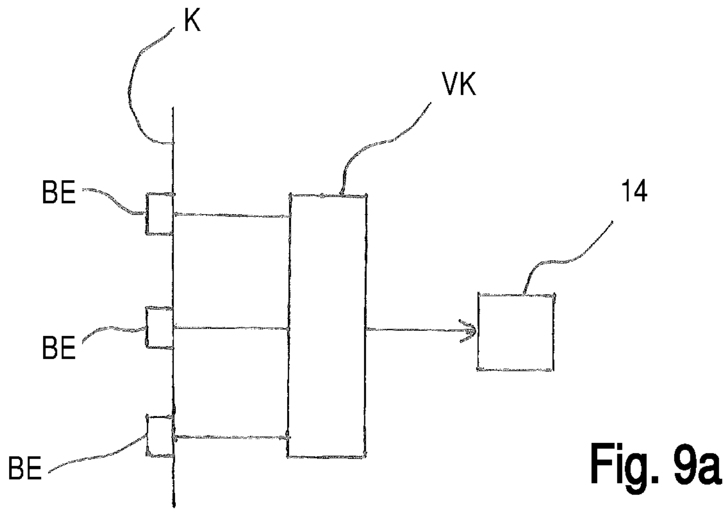

As exemplarily and schematically illustrated in FIG. 9*a*, already before the retrofit with the inventive system the possibility existed in the elevator system installed in a building to enter a destination request (particularly destination floor) into the car control panel K. For this the car control panel K comprises one or more operation elements BE, e.g. buttons, a touchscreen or a microphone for voice input. Between the operation elements BE and the control 14 of the elevator a connection device VK was already present prior to the retrofit for submission of the input destination request to the control 14 of the elevator.

Figure 9B:
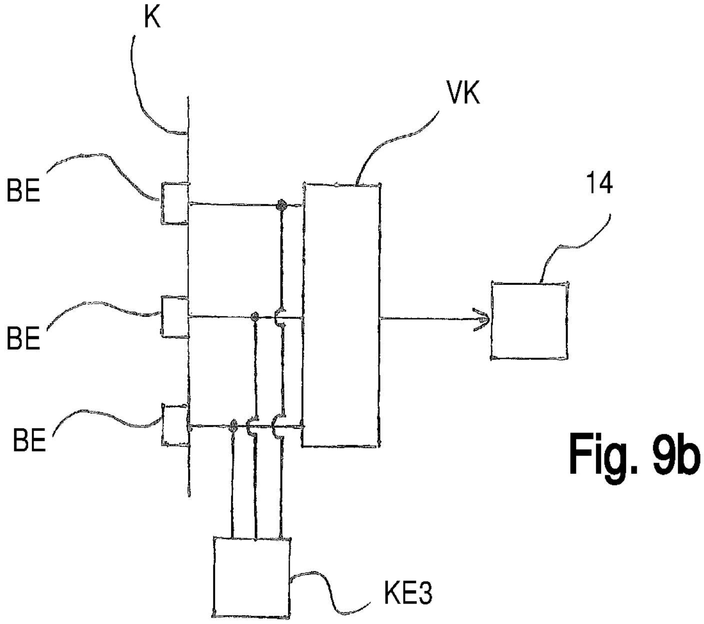

The second communication unit KE2 of the inventive retrofit set is preferably configured to be connected with the car control panel K and/or the connection device VK such that the destination request input in the third communication unit KE3 via the first communication unit KE1 and/or via the second communication unit KE2 can be transmitted to the control 14 of the elevator via the connection device VK of the existing elevator system. FIG. 9*b* schematically illustrates the elevator system according to FIG. 9*a* that is retrofit with an exemplary third communication unit KE3 that is connected with the control 14 via the connection device VK in order to submit a command and particularly a destination command to the control 14.

A system (10) is provided comprising a first communication unit (KE1), a second communication unit (KE2) and a third communication unit (KE3). The first communication unit (KE1) is mobile and can be carried by a user (B). The second communication unit (KE2) is configured to be installed in a stationary manner, preferably near an elevator shaft door (11). The third communication unit (KE3) is configured to be installed in a stationary manner at or in the elevator car (LK). By at least one of the communication units (KE1, KE2, KE3) at least one of a readiness request message and a destination message can be submitted to the control (14) of the elevator (L).

LIST OF REFERENCE SIGNS

10 system
11 elevator shaft door
12 elevator shaft
13 car door
14 control
L elevator
LK elevator car
B user
R floor control panel
K car control panel
BE operation element
VR connection device for the floor control panel
VK connection device for the car control panel
KE1 first communication unit
KE2 second communication unit
KE3 third communication unit
FS indication radio signal
FB radio range
NB near range
PE processor unit
FM radio module
C Central
P Peripheral
OS operating system
A application (App)
100 method
101 step
102 step
103 step
104 step
105 step
202, 202' method
201 step
202 step
203 step
204 step
205 step
205*a* step
206 step
207 step
208 step
209 step
206' step
207' step
208' step
209' step
210' step

The invention claimed is:

1. A system (10) for transport of a user (B) to a destination with an elevator (L), wherein the elevator (L) comprises a control (14), wherein the system (10) comprises:

a first communication unit (KE1) configured to be carried by the user (B);

at least one second communication unit (KE2) configured to be installed in a stationary manner; and at least one third communication unit (KE3) configured to be installed at and/or in an elevator car (LK) such that the installed third communication unit (KE3) moves together with the elevator car (LK);

wherein the first communication unit (KE1) is configured to communicate with the at least one second communication unit (KE2) in order to submit a readiness request message to the control (14) of the elevator (L) from the first communication unit (KE1) via the at least one second communication unit (KE2) and/or to communicate with the at least one second communication unit (KE2) in order to initiate a submission of a readiness request message to the control (14) of the elevator (L), to make the elevator (L) ready for the transport of the user (B);

wherein the first communication unit (KE1) is configured to communicate with the at least one second communication unit (KE2) and/or with the at least one third communication unit (KE3) in order to submit a destination message about the destination of the user (B) from the first communication unit (KE1) to the control (14) of the elevator (L) and/or to communicate with individual ones of the at least one second communication unit (KE2) or the at least one third communication unit (KE3) in order to initiate a submission of a destination message about the destination of the user (B) to the control (14) of the elevator (L) for the transport of the user (B) to the destination by means of the elevator (L);

wherein the first communication unit (KE1), the at least one second communication unit (KE2), and the at least one third communication unit (KE3) are configured to communicate using a Bluetooth Low Energy (BLE) standard in which one of the communication units operating as Peripheral (P) transmits a BLE-Advertisement and another one of the communication units acting as Central (C) scans for emitted BLE-advertisements; and wherein the first communication unit (KE1) and the at least one second communication unit (KE2) are configured to operate as peripheral (P) and as central (C) concurrently or quasi-concurrently.

2. The system according to claim 1, wherein the first communication unit (KE1) is configured to inform the at least one second communication unit (KE2) about the destination of the user (B), and wherein the at least one second communication unit (KE2) is configured to subsequently inform the third communication unit (KE3) about the destination.

3. The system according to claim 1, wherein the third communication unit (KE3) is configured to submit the destination to the control (14) of the elevator (L).

4. The system according to claim 1, wherein the system (10) is configured to determine the radio signal strength of radio signals emitted from the first communication unit (KE1) and/or the third communication unit (KE3) in order to determine whether the user (B) has moved the first communication unit (KE1) in the elevator car (LK).

5. The system according to claim 1, wherein the second communication unit is configured to be attached at or in a floor control panel (R) and/or wherein the third communication unit (KE3) is configured to be attached at or in a car control panel.

6. The system according to claim 1, wherein the at least one second communication unit (KE2) is configured to be attached at a support of a floor control panel (R) and/or wherein the third communication unit (KE3) is configured to be attached at a support of a car control panel (K).

7. The system according to claim 1, wherein the at least one second communication unit (KE2) is integrated in a floor control panel (R) and/or wherein the third communication unit (KE3) is integrated in a car control panel (K).

8. The system according to claim 1, wherein the at least one second communication unit (KE2) is in communication connection with the control (14) of the elevator (L) via a floor control panel (R) or wherein the at least one second communication unit (KE2) is in direct communication connection with the control (14) of the elevator (L) and/or wherein the third communication unit (KE3) is in communication connection with the control (14) of the elevator (L) via a car control panel (K) or wherein the third communication unit (KE3) is in direct communication connection with the control (14) of the elevator (L).

9. The system (10) according to claim 1, wherein a floor control panel (R) of the elevator (L) comprises at least one operation element (BE) for control of the elevator (L), wherein when actuated by the user (B) of the elevator (L) the operation element (BE) submits an actuation signal to the control (14) of the elevator (L) via a connection device (VR), wherein the at least one second communication unit (KE2) is connected with the connection device (VR) in order to submit a respective actuation signal to the control (14) via the connection device (VR).

10. The system (10) according to claim 1, wherein the elevator car (LK) of the elevator (L) comprises a car control panel (K), wherein the car control panel (K) comprises at least one operation element (BE) for control of the elevator (L), wherein when actuated by the user (B) of the elevator (L) the operation element (BE) submits an actuation signal to the control (14) of the elevator (L) via a connection device (VK), wherein the third communication unit (KE3) is connected with the connection device (VK) in order to submit a respective actuation signal to the control (14) via the connection device (VK).

11. The system according to claim 1, wherein the system is configured to carry out a method (100) for transmission of data, including a readiness request message and/or a destination message between the first communication unit (KE1) carried by a user (B) and at least one second communication unit (KE2) and/or between the first communication unit (KE1) and the third communication unit (KE3), wherein an application (A) configured to run on the first communication unit (KE1) is provided for transmission of data between the first communication unit (KE1) and individual ones of the at least one second communication unit (KE2) and the third communication unit (KE3), the method comprising the steps:

emitting (101) an indication radio signal (FS) by the first communication unit (KE1) while the application (A) is not running in a foreground on the first communication unit (KE1), receiving (102) the emitted indication radio signal (FS) by the at least one second communication unit (KE2) or the third communication unit (KE3), establishing (103) a connection between the first communication unit (KE1) and individual ones of the at least one second communication unit (KE2) and the third communication unit (KE3) following the receipt of the indication radio signal (FS), submitting (104) data from the first communication unit (KE1) to individual ones of the at least one second communication unit (KE2) and the third communication unit (KE3) and/or submitting (104) data from individual ones of the at least one second communication unit (KE2) and the third communication unit (KE3) to the first communication unit (KE1).

12. The system (10) according to claim 1, wherein the system is configured to carry out a method (200, 200') for transmission of data, including a readiness request message or a destination message between the first communication unit (KE1) and the at least one second communication unit (KE2) and the third communication unit (KE3), wherein an application (A) for transmission of data between the first communication unit (KE1) and the at least one second communication unit (KE2) and the third communication unit (KE3) is configured to be run on the first communication unit (KE1), the method comprising the following steps:

emitting an indication radio signal (FS) by the at least one second communication unit (KE2) or emitting an indication radio signal (FS) by the third communication unit (KE3), receiving the emitted indication radio signal (FS) by the first communication unit (KE1) while the application does not run in a foreground on the first communication unit (KE1), transitioning (204) of the application (A) to a background or to the foreground as necessary, establishing a connection between the first communication unit (KE1) and individual ones of the at least one second communication unit (KE2) and the third communication unit (KE3), submitting data from the first communication unit (KE1) to individual ones of the at least one second communication unit (KE2) and third communication unit (KE3) and/or submitting data from the at least one second communication unit (KE2) and third communication unit (KE3) to the first communication unit (KE1).

13. The system (10) according to claim 12, wherein the system is configured to automatically establish the connection between the first communication unit (KE1) and individual ones of the at least one second communication unit (KE2) and the third communication unit (KE3) under the condition that the user (B) has provided specific data to be submitted before and wherein the specific data are submitted to the at least one second communication unit (KE2) or the third communication unit (KE3) via the established connection, while the application (A) remains in the background.

14. The system according to claim 12, wherein the system is configured such that a communication connection is established between the first communication unit (KE1) and the at least one second communication unit (KE2) or third communication unit (KE3), if the application (A) is transitioned to the foreground, wherein the user is enabled to input data in the first communication unit (KE1), wherein the input data are transmitted from the first communication unit (KE1) to the at least one second communication unit (KE2) or third communication unit (KE3).

15. The system (10) according to claim 1, wherein the system is configured such that the first communication unit (KE1) sends indication radio signals (FS) after interruption of a communication connection.

16. The system according to claim 1, wherein the first communication unit (KE1) is configured to send the BLE-advertisement while an application (A) configured to run on the first communication unit (KE1) for transmission of data between the first communication unit (KE1) and the at least one second communication unit (KE2) and/or the third communication unit (KE3) is not run in a foreground of the first communication unit (KE1) and either has a suspended status wherein the application (A) is in a background of the first communication unit (KE1) without executing program code of the application (A) or has a status in which the application (A) has been terminated by an operating system of the first communication unit (KE1).

17. A retrofit set for an elevator system for retrofit of the elevator system wherein the retrofit set comprises:

at least one second communication unit (KE2); and at least one third communication unit (KE3);

wherein an elevator (L) of the elevator system comprises a control (14);

wherein the retrofit set is configured to operate as part of a system (10), wherein the system comprises:

a first communication unit (KE1) configured to be carried by a user (B);

the at least one second communication unit (KE2) configured to be installed in a stationary manner; and the at least one third communication unit (KE3) configured to be installed at and/or in an elevator car (LK) such that the installed third communication unit (KE3) moves together with the elevator car (LK);

wherein the first communication unit (KE1) is configured to communicate with the at least one second communication unit (KE2) in order to submit a readiness request message to the control (14) of the elevator (L) from the first communication unit (KE1) via the at least one second communication unit (KE2) and/or to communicate with the at least one second communication unit (KE2) in order to initiate a submission of a readiness request message to the control (14) of the elevator (L), to make the elevator (L) ready for the transport of the user (B);

wherein the first communication unit (KE1) is configured to communicate with the at least one second communication unit (KE2) and/or with the at least one third communication unit (KE3) in order to submit a destination message about the destination of the user (B) from the first communication unit (KE1) to the control (14) of the elevator (L) and/or to communicate with individual ones of the at least one second communication unit (KE2) or the at least one third communication unit (KE3) in order to initiate a submission of a destination message about the destination of the user (B) to the control (14) of the elevator (L) for the transport of the user (B) to the destination by means of the elevator (L);

wherein the first communication unit (KE1), the at least one second communication unit (KE2), and the at least one third communication unit (KE3) are configured to communicate using a Bluetooth Low Energy (BLE) standard in which one of the communication units operating as Peripheral (P) transmits a BLE-Advertisement and another one of the communication units acting as Central (C) scans for emitted BLE-advertisements; and wherein the first communication unit (KE1) and the at least one second communication unit (KE2) are configured to operate as peripheral (P) and as central (C) concurrently or quasi-concurrently.

18. The retrofit set according to claim 17, wherein the at least one second communication unit (KE2) is configured to be connected with a connection device (VR) that connects a floor control panel (R) and the control (14) of the elevator (L) in order to transmit the readiness request message from the floor control panel (R) to the control (14) via the connection device (VR) and/or wherein the third communication unit (KE3) is configured to be connected with a connection device (VK) that connects a car control panel (K) with the control (14) of the elevator (L) for transmission of the destination message from a car control panel (K) to the control (14) via the connection device (VR).

* * * * *